US011961357B2

(12) United States Patent
Essex

(10) Patent No.: US 11,961,357 B2
(45) **Date of Patent: *Apr. 16, 2024**

(54) ELECTRONIC GAMING MACHINE AND METHODS FOR DISPLAYING SUPPLEMENTAL INFORMATION

(71) Applicant: Aristocrat Technologies Australia Pty Limited, North Ryde (AU)

(72) Inventor: Bruce W. Essex, Las Vegas, NV (US)

(73) Assignee: Aristocrat Technologies Austalia PTY Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/121,953

(22) Filed: Mar. 15, 2023

(65) Prior Publication Data

US 2023/0215241 A1 Jul. 6, 2023

Related U.S. Application Data

(63) Continuation of application No. 17/361,040, filed on Jun. 28, 2021, now Pat. No. 11,615,669, which is a continuation of application No. 16/740,291, filed on Jan. 10, 2020, now Pat. No. 11,062,552, which is a continuation of application No. 16/134,547, filed on Sep. 18, 2018, now Pat. No. 10,621,815.

(60) Provisional application No. 62/625,946, filed on Feb. 2, 2018.

(51) Int. Cl.
*G07F 17/32* (2006.01)
*G07F 17/34* (2006.01)

(52) U.S. Cl.
CPC ...... *G07F 17/3213* (2013.01); *G07F 17/3209* (2013.01); *G07F 17/326* (2013.01); *G07F 17/34* (2013.01)

(58) Field of Classification Search
CPC ............. G07F 17/3213; G07F 17/3209; G07F 17/326; G07F 17/34
See application file for complete search history.

(56) References Cited

U.S. PATENT DOCUMENTS

| | | | |
|---|---|---|---|
| D3,184 | S | 8/1868 | Winslow et al. |
| D470,505 | S | 2/2003 | Platz |
| 6,535,890 | B2 | 3/2003 | Sandifer |

(Continued)

OTHER PUBLICATIONS

Notice of Allowance dated Jun. 12, 2020 for U.S. Appl. No. 29/674,954 (pp. 1-7).

(Continued)

*Primary Examiner* — Werner G Garner
(74) *Attorney, Agent, or Firm* — Brownstein Hyatt Farber Schreck, LLP

(57) ABSTRACT

Embodiments provide systems, apparatus, and methods for rendering supplemental information on an electronic gaming device, where the supplemental information does not relate to game play on the machine. The supplemental information can include safety warnings, maintenance information, or other information. The electronic gaming device can detect user interactions with the electronic gaming device, such as using sensors or a player interface that includes a touchscreen. The user interactions can be compared with a condition associated with the supplemental information. Feedback, such as visual, audio, or haptic feedback, or a combination thereof, can be provided to indicate to the user whether the condition is satisfied. Numerous additional aspects are disclosed.

20 Claims, 9 Drawing Sheets

(56) References Cited

U.S. PATENT DOCUMENTS

| | | | |
|---|---|---|---|
| 6,768,998 | B2 | 7/2004 | Leonard |
| D563,422 | S | 3/2008 | Yamashita |
| 7,555,376 | B2 | 6/2009 | Beronja |
| D620,027 | S | 7/2010 | Ridgeway |
| D644,661 | S | 9/2011 | Gardner |
| D644,663 | S | 9/2011 | Gardner |
| D683,366 | S | 5/2013 | Gardner |
| 8,744,668 | B2 | 6/2014 | Selkirk |
| D719,586 | S | 12/2014 | Jon |
| D719,841 | S | 12/2014 | Robson |
| D724,099 | S | 3/2015 | Matias |
| D725,403 | S | 3/2015 | Gottschalk |
| D730,937 | S | 6/2015 | Kim |
| D737,326 | S | 8/2015 | Lee |
| D745,044 | S | 12/2015 | Chambers |
| D762,221 | S | 7/2016 | Woo |
| D803,235 | S | 11/2017 | Markson |
| D803,889 | S | 11/2017 | Faulkner |
| D815,667 | S | 4/2018 | Yeung |
| D819,052 | S | 5/2018 | Norris |
| D823,877 | S | 7/2018 | Ludwick |
| D826,258 | S | 8/2018 | Silva |
| D878,420 | S | 3/2020 | Dedonato |
| 10,621,815 | B2 | 4/2020 | Essex |
| 2003/0064805 | A1 | 4/2003 | Wells |
| 2004/0235562 | A1 | 11/2004 | Kiely |
| 2009/0325692 | A1 | 12/2009 | Klostermann |
| 2010/0203961 | A1 | 8/2010 | Burke |
| 2010/0255902 | A1 | 10/2010 | Goldstein |
| 2011/0035797 | A1 | 2/2011 | Slowik |
| 2011/0068921 | A1 | 3/2011 | Shafer |
| 2011/0119244 | A1 | 5/2011 | Millard |
| 2014/0188271 | A1 | 7/2014 | Hernandez |
| 2015/0126279 | A1 | 5/2015 | Lyons |
| 2019/0073879 | A1 | 3/2019 | Marks |
| 2019/0244473 | A1 | 8/2019 | Essex |

OTHER PUBLICATIONS

Office Action dated Jul. 23, 2020 for U.S. Appl. No. 29/674,951 (pp. 1-6).

Notice of Allowance dated Oct. 21, 2020 for U.S. Appl. No. 29/674,951 (pp. 1-8).

Office Action dated Oct. 28, 2020 for U.S. Appl. No. 16/740,291 (pp. 1-12).

Notice of Allowance dated Mar. 17, 2021 for U.S. Appl. No. 16/740,291 (pp. 1-10).

Office Action (Non-Final Rejection) dated Apr. 11, 2022 for U.S. Appl. No. 17/361,040 (pp. 1-21).

Office Action (Final Rejection) dated Sep. 16, 2022 for U.S. Appl. No. 17/361,040 (pp. 1-15).

Office Action (Notice of Allowance and Fees Due (PTOL-85)) dated Nov. 30, 2022 for U.S. Appl. No. 17/361,040 (pp. 1-9).

Australian Examination Report No. 1 issued in App. No. AU2019200708, dated Oct. 31, 2023, 3 pages.

ELECTRONIC GAMING MACHINE AND METHODS FOR DISPLAYING SUPPLEMENTAL INFORMATION

RELATED APPLICATIONS

This application is a continuation of U.S. patent application Ser. No. 17/361,040, filed Jun. 28, 2021, which is a continuation of U.S. patent application Ser. No. 16/740,291, filed on Jan. 10, 2020, now U.S. Pat. No. 11,062,552, which in turn is a continuation of U.S. patent application Ser. No. 16/134,547, filed Sep. 18, 2018, now U.S. Pat. No. 10,621,815, which in turn claims the benefit of U.S. Provisional Patent Application No. 62/625,946, filed Feb. 2, 2018. Each of these prior applications is hereby incorporated by reference in its entirety as if fully disclosed herein.

FIELD

The present invention relates to gaming and wagering, and more specifically to electronic gaming machines and methods for displaying supplemental information.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Gaming machines can be relatively large and heavy, and can present injury risks if not manipulated properly. Gaming machines can also be relatively complex, having a variety of mechanical and computer components that may require periodic servicing. Accordingly, room for improvement exists.

SUMMARY

In some embodiments of the disclosed technology, a method is disclosed that is performed by an electronic gaming machine that includes at least one processor and at least one computer-readable media coupled to the at least one processor. The computer-readable media includes instructions for performing the method. The method includes determining that a triggering event has occurred. The triggering event indicates that supplemental information should be rendered for display on the electronic gaming machine. At least one condition associated with the triggering event is determined. Supplemental content is determined that is associated with the at least one condition. The supplemental information does not relate to game play on the electronic gaming machine. A position is determined at which the supplemental information should be displayed, and the supplemental information is rendered at the determined position.

In other embodiments, the present disclosure provides a gaming device that includes a display and a cabinet, the cabinet having a door configured to provide access to an interior space of the cabinet. A sensor is in communication with the door. The gaming device can also include a player interface that includes a touchscreen, a processor, and memory storing instructions executable on the processor.

The operations can include receiving data from the sensor indicating that the door was moved from a secured position to an unsecured position. It can be determined that the data triggers a condition associated with supplemental information to be rendered on the display, where the supplemental information does not relate to game play on the gaming device. Supplemental information associated with the condition is determined and rendered on the display.

In further embodiments, computer-readable storage media is provided that includes instructions for performing processing. The processing includes receiving an indication that a user is to service one or more components of an electronic gaming machine. Supplemental information can be displayed on a display of the electronic gaming machine. The supplemental information can include an action to be taken by the user with respect to a component of the one or more components. A user interaction with the component of the one or more components is detected. An indication of whether the action was correctly performed by the user can be rendered for display.

Still other features, aspects, and advantages of embodiments will become more fully apparent from the following detailed description, the appended claims, and the accompanying drawings illustrating a number of example embodiments and implementations, including the best mode contemplated for carrying out the embodiments. Embodiments may also be capable of other and different applications, and several details may be modified in various respects, all without departing from the spirit and scope of the disclosed embodiments. Accordingly, the drawings and descriptions are to be regarded as illustrative in nature, and not as restrictive. The drawings are not necessarily drawn to scale. All references cited herein are incorporated by reference in their entirety.

BRIEF DESCRIPTION OF DRAWINGS

The following drawings illustrate some embodiments of the disclosed technologies.

DETAILED DESCRIPTION

Example 1—Example Overview

Figure 1:
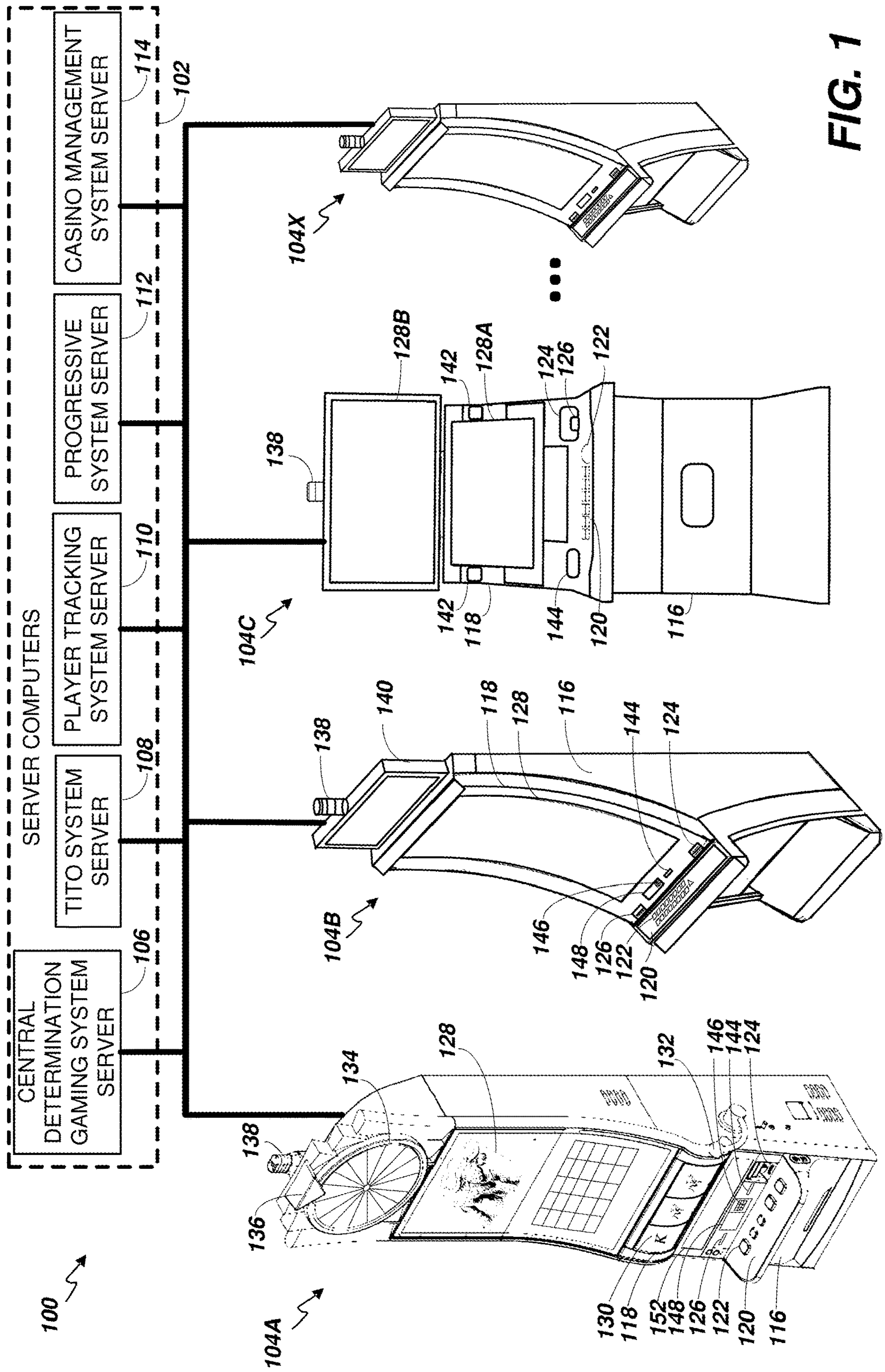
FIG. 1 is an exemplary diagram showing several electronic gaming machines networked with various gaming related servers.

Embodiments disclosed herein describe a gaming system and devices that enable an electronic gaming machine (EGM) and methods for displaying supplemental information. In the context of EGMs, safety information, service diagnosis, and installation and/or repair information have been handled through costly and labor intensive visits to gaming locations. Those visits involve service technicians using diagnostic equipment and relying on access to cumbersome manuals and technical bulletins, sometimes on paper, sometimes not up-to-date, and sometimes located in a field office remote from the gaming systems. For example, when visiting a gaming location for service and accessing the gaming machine's delicate hardware, the technician has no guidance or warnings at the EGM as to pinch points or ways to ensure access to the EGM is done in such a way as to minimize potential damage to gaming hardware, when, for example, the EGM is opened or closed.

Even once the technician accesses the EGM and is able to diagnose the EGM, the process of on-site diagnosis and repair can be costly, time-consuming, and labor intensive. Technicians and others typically have to locate service menus, manuals, instructions, and technical bulletins and advisories, perhaps from cumbersome printed information regarding maintenance and repair of equipment, from multiple locations or field offices, all in order to diagnose hardware or other operational issues with a particular EGM before being able to properly service the unit or set of units.

As the number of EGMs grows at one location or at multiple locations, the potential for injuries arising from accessing an EGM increases, and the efficiency of servicing in the existing manner markedly diminishes. These issues may be present for EGM installation or related to installation or service of EGM signage. Further, logging the installation of and/or service performed on EGMs that may be required for jurisdictional standards may also prove costly and time consuming.

In short, the existing approaches for installation and servicing of EGMs can present potential safety issues for a service technician and others, and potential risks to the costly EGM hardware, when accessing the gaming machines. Existing approaches can also increase costs, time and labor involved in servicing, maintenance, repair, game code updates, game menu updates, and the like, of EGMs.

One or more embodiments of the disclosed technologies address the above and other drawbacks of the prior art by allowing a gaming device to display supplemental information that can improve safety and facilitate servicing of an electronic gaming machine. For instance, supplemental information can be displayed to guide a user in closing a component of an electronic gaming machine, so that a risk of tipping the electronic gaming machine is minimized, such as by guiding a user to apply force at the most efficient location. Similarly, the supplemental information can warn a user against making contact with certain areas of the electronic gaming machine, such as areas that might present a risk of injury to the user.

Supplemental information can also be used to assist in servicing an electronic gaming machine. Servicing guidance, including the presentation of repair manuals or service bulletins, can be displayed on the electronic gaming machine. In at least some embodiments, the electronic gaming machine can detect when an action has been correctly or incorrectly performed. Feedback, such as visual feedback, can be provided to a user to indicate whether the action has been correctly performed. Providing service information can decrease the cost of servicing an electronic gaming machine, as well allowing servicing to occur more quickly, as there may be a reduced need to wait for specialized service personnel or for service documents to be obtained.

With these and other advantages and features of the disclosed technologies that will become apparent, the nature of the disclosed technologies may be more clearly understood by reference to the following detailed description of the disclosed technologies, the appended claims and to the several drawings included herein. In the following description, reference is made to the accompanying drawings that form a part hereof, and in which is shown, by way of illustration, some specific example embodiments in which the disclosed technologies may be practiced. These embodiments are described in sufficient detail to enable those skilled in the art to practice the disclosed technologies, and it is to be understood that other embodiments may be utilized and that structural, logical, software, hardware, and electrical changes may be made without departing from the scope of the disclosed technologies. The following description is, therefore, not to be taken in a limited sense, and the scope of the disclosed technologies is defined by the appended claims.

Example 2—Example Terms

Throughout the description that follows and unless otherwise specified, the following terms may include and/or encompass the example meanings provided in this section. These terms and illustrative example meanings are provided to clarify the language selected to describe embodiments of the disclosed technologies both in the specification and in the appended claims.

The term "game" may refer to a gambling event with a beginning and end that may encompass one or more spins, handle pulls, or spans of time. The end of the game may be determined voluntarily (in which the player elects to stop play) or involuntarily (in which the gaming device terminates play). In some embodiments, a game may include non-gambling events such as pachinko games, skilled based games, non-RTP-based games, bonus games, or the like.

The terms "primary game" or "base game" may refer to play resulting from the spinning of standard physical or virtual (e.g., electronic, video or graphical) slot reels, the dealing of physical or virtual (e.g., electronic, video, or graphical) cards, or other game outcomes. For example, the outcome of a primary game might be cherry-cherry-bar, 4 hits on a 7-spot keno ticket, or the hand Ks (king of spades), Qd (queen of diamonds), 4h (four of hearts), 2s (two of spades), 6s (six of spades) in video poker.

The terms "bonus game", "feature game", and "secondary game" may refer to an additional game playable on a gaming device that is separate from the primary game. A bonus game typically does not require the player to wager any additional funds or credits and may include the possibility of winning a relatively large payout. It should be understood that in some embodiments, a bonus game may require an additional wager.

The term "gaming device" may refer to any electrical, mechanical, or electro-mechanical device, including an EGM, that, in a manner well known in the art, may accept wagers, steps through a process to determine an outcome, and may pay winnings based on the outcome. In some embodiments, the outcome may be randomly generated, as with a slot machine; may be generated through a combination of randomness and player skill, as with video poker; or may be generated entirely through player skill. Gaming devices may include slot machines (both with virtual and/or mechanical reels), video poker machines, video blackjack machines, video roulette machines, keno machines, video bingo machines, pachinko machines, lottery terminals, handheld gaming devices, and the like. In some embodiments, handheld gaming devices may include smartphones, tablets, and other portable devices.

The term "game controller" may refer to a circuit (e.g., an electronic circuit board, a programmable computer chip, an integrated circuit (IC), etc.) within a gaming device that includes one or more processors that process game play instructions in accordance with game play rules, and outputs or generates game play outcomes to one or more displays, screens, or monitors. The game play rules may be stored as program code in a memory but can also be hardwired in a dedicated circuit. In some embodiments, the memory may also store data indicative of a plurality of symbols, pay tables, reel strip layouts, images, and/or other information to be used in games.

The term "processor" when described as part of, or existing within a game controller, may refer generically to any device that can process game play instructions in accordance with game play rules and may include: a microprocessor, microcontroller, programmable logic device, digital signal processors, graphics processors, and/or other computational device, a general-purpose computer (e.g. a PC) or a server. That is, a processor may be provided by any suitable logic circuitry for receiving inputs, processing the inputs in accordance with instructions stored in memory and generating outputs (for example on the display). Such processors may also be referred to as central processing units (CPUs). Most processors are general purpose units, however, it is also known to provide a specific purpose processor using, for example, an application specific integrated circuit (ASIC) or a field programmable gate array (FPGA). Exemplary processors include the INTEL® PENTIUM® and the AMD® ATHLON® processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

The term "peripheral device" may refer to a device operatively connected (e.g., physically, wirelessly, and/or logically) to a gaming device (e.g., more specifically to a game controller within a gaming device) that is configured to assist in the operation of game, play, payout, wager and/or player tracking related functions. In some embodiments peripheral devices may be located near players at a table game.

The term "slot machine" may refer to a gaming device or any mechanical, electrical or other device, contrivance, or machine which, upon insertion of any monetary value in the form of a bill, a coin, ticket, token or similar object, or upon payment via electronic funds transfer (EFT), a mobile device, and/or a wireless device, or upon payment of any consideration, is available to play or operate, the play or operation of which, whether by reason of the skill of the operator in playing a gambling game which is presented for play by the machine or application of the element of chance, or both, may deliver or entitle the person playing or operating the machine to receive cash, premiums, merchandise, tokens, tickets, or anything of value, whether the payoff is made automatically from the machine or in any other manner.

As used herein a "network" generally refers to an energy delivery network. However, in some embodiments, an information or computing network can be used that provides an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display.

The present disclosure may refer to a "control system", application, or program. A control system, application, or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

Example 3—Example System

An example embodiment of the system 100 of the disclosed technologies is depicted in FIG. 1. The disclosed technologies can be configured to work as a system 100 in a network environment including one or more server computers 102 (e.g., slot servers of a casino) that are in communication, via a communications network, with one or more gaming devices 104A-X. Server computers 102 may include, for example, a slot server in a casino, configured to communicate with gaming devices 104A-X, which may be configured as EGMs such as slot machines, video poker machines, etc. Server computers 102 may communicate with the gaming devices directly or indirectly, via a wired or wireless medium such as the Internet, WiFi, Ethernet, other LAN or WAN protocols, or via any appropriate communications means or combination of communications means. Higher level communications protocols may be used to facilitate communications between server computers 102 and gaming devices 104A-X. Each of the gaming devices 104A-X may include an EGM that is configured to communicate with the server computers 102. Any number and type of gaming devices 104A-X may be in communication with the server computers 102.

Communication between the gaming devices 104A-X and the server computers 102, and among the gaming devices 104A-X, may be direct or indirect, such as over the Internet through a Web site maintained by computer on a remote server or over an online data network including commercial online service providers, Internet service providers, private networks, and the like. In yet other embodiments, the gaming devices 104A-X may communicate with one another and/or the server computers 102 over RF, cable TV, satellite links and the like.

Some, but not all, possible communication networks that may comprise the network or be otherwise part of the system 100 include: a local area network (LAN), a wide area network (WAN), the Internet, a telephone line, a cable line, a radio channel, an optical communications line, and a satellite communications link. Example communications protocols that may be part of the system include: Ethernet (or IEEE 802.3), Session Announcement Protocol (SAP), Autonomous Transport Protocol (ATP), Bluetooth™, and Transmission Control Protocol/Internet Protocol (TCP/IP). In addition, as described below, session, presentation, and application layer protocols may also be employed. Communication may be encrypted to ensure privacy, provide security, and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for days or weeks at a time.

In some embodiments, server computers 102 may not be necessary and/or preferred. For example, the disclosed technologies may, in one or more embodiments, be practiced on a stand-alone gaming device such as gaming device 104A and/or a gaming device 104A in communication only with one or more other gaming devices 104B-X (i.e., without server computers 102). In such embodiments, any functions described as performed by the server computers 102 or data described as stored on the server computers 102 may instead be performed by or stored on one or more gaming devices 104A-X.

As discussed above, server computers 102 can include one or more servers. In some embodiments, the servers may be embodied as conventional slot servers that provide various gaming device monitoring and management functions. Examples of such systems are described in U.S. patent application Ser. No. 11/225,407, by Wolf, et al., entitled "METHODS AND DEVICES FOR MANAGING GAMING NETWORKS" and filed Sep. 12, 2005, which is incorporated herein by reference in its entirety and for all purposes.

In other embodiments, the server computers 102 can include a central determination gaming system server 106. A central determination gaming system server 106 can be embodied as described in U.S. Pat. No. 8,932,129 by Powell, et al., which is hereby incorporated herein for all purposes. As described in more detail below, gaming devices 104A-X can include features to enable operation of the central determination gaming system server 106 for use by the player and operator (e.g., the casino). In such systems, a game outcome may be generated on the central determination gaming system 106 that is typically a host computer server. The game outcome is then transmitted over the network to any of a group of remote terminals or remote gaming devices 104A-X that utilize the game outcome and display the result to the player. The remote gaming devices 104A-X are connected to the central determination gaming system 106 via a network such as a local area network, a wide area network, an intranet or the Internet. The remote gaming devices 104A-X may be portable gaming devices such as, but not limited to, a smart phone, a tablet, a laptop, a cell phone, a personal digital assistant, a personal computer, and a wireless game player.

In some embodiments, images rendered from 3-D gaming environments may be displayed on portable gaming devices that are used to play the game. Further the gaming devices 104A-X or the central determination gaming system 106 may include gaming logic for commanding a remote gaming device to render an image from a virtual camera in 3-D gaming environments stored on the remote gaming devices 104A-X and to display the rendered image on a display located on the remote gaming devices 104A-X. Thus, those of skill in the art will understand that embodiments of the disclosed technologies, as described below, can be deployed on most any gaming device currently available or hereafter developed.

The server computers 102 can also include a ticket-in-ticket-out (TITO) system server 108. A TITO system server 108 can be embodied as described in U.S. Pat. No. 6,048,269 by Burns, et al., which is hereby incorporated herein for all purposes. As described in more detail below, gaming devices 104A-X can include features to enable operation of the TITO system server 108 for use by the player and operator (e.g., the casino).

The server computers 102 can also include a player tracking system server 110. A player tracking system server 110 can be embodied as described in U.S. Pat. No. 6,142,876 by Cumbers, which is hereby incorporated herein for all purposes. As described in more detail below, gaming devices 104A-X can include features to enable operation of the player tracking system server 110 for use by the player and operator (e.g., the casino).

The server computers 102 can also include a progressive system server 112. A progressive system server 112 can be embodied as described in U.S. Patent Publication No. US 2006/0287077 by Gray, et al., which is hereby incorporated herein for all purposes. As described in more detail below, gaming devices 104A-X can include features to enable operation of the progressive system server 112 for use by the player and operator (e.g., the casino).

The server computers 102 can also include a casino management system server 114. A casino management system server 114 can be embodied as described in PCT Patent Publication No. WO 2005/02609A2 by Frerking, et al., which is hereby incorporated herein for all purposes. As described in more detail below, gaming devices 104A-X can include features to enable operation of the casino management system server 114 for use by the operator (e.g., the casino).

Example 4—Example Devices

Still referring to FIG. 1, the gaming devices 104A-C illustrated are specific exemplary embodiments of EGMs suitable for use with embodiments of the disclosed technologies, and the same or similar elements shown in gaming devices 104A-C may be included in any gaming device 104X, which is also suitable for use with embodiments of the disclosed technologies. Details of an example gaming device 104A are now described in detail. The particular example gaming device 104A pictured is a Relm XL™ model gaming device manufactured by Aristocrat® Technologies, Inc.

Gaming device 104A may include a main cabinet 116, which generally surrounds the device's interior (not shown) and is viewable by players. The main cabinet 116 can include a main door 118 on the front of the gaming device 104A, which opens to provide access to the interior of the gaming device 104A. Main cabinet 116 can typically include a button area or button deck 120 accessible by a player that is configured with input switches or buttons 122, a bill validator 124, a ticket-out printer 126 and a coin tray (not present in the example embodiment shown in FIG. 1). In some embodiments, a coin-in slot may also be provided.

In some aspects, the buttons 122 in the button deck 120 can be physical buttons, or other user-actuatable selection elements, such as switches, dials, knobs, and the like. In further aspects, the button deck 120 can be a virtual button deck and can be, or include, a display, such as a capacitive touchscreen. The buttons 122 can be virtual buttons, or other selection elements, that can be actuated through suitable user interaction (e.g., by performing pressing, swiping, dragging, or similar actions on the display of the virtual button deck 120). Suitable virtual button decks 120 include the virtual button deck included in the Helix XT™ model gaming device manufactured by Aristocrat® Technologies, Inc. Although described with respect to the gaming device 104A, the button decks 120 of one or both of gaming devices 104B or 104C can be virtual button decks having virtual buttons 122.

In many configurations, a main display 128 (e.g., video display monitor) is mounted to, or above, the main door 118. The main display 128 can be a high-resolution LCD, plasma, LED, or OLED panel which may be flat or curved as shown, a cathode ray tube, or other conventional electronically controlled video monitor. Bill validator 124, player-input buttons 122 and main display 128 are interface components used to play a game on the gaming device 104A.

In some embodiments, the bill validator 124 may also function as a "ticket-in" reader that allows the player to use a casino issued credit ticket to load credit onto the gaming device 104A (e.g., in a cashless ticket (TITO) system). In such cashless embodiments, the gaming device 104A may also include a "ticket-out" printer 126 for outputting a credit ticket when a "cash out" button is pressed. Cashless ticket systems are well known in the art and are used to generate and track unique bar-codes that are printed on tickets to allow players to avoid the use of bills and coins for loading credits using ticket reader and cashing out credits through the use of ticket-out printer 126 on the gaming device 104A.

In some embodiments, a player tracking card reader 144, a transceiver for wireless communication with a player's smartphone, a keypad 146, and/or an illuminated display 148 for reading, receiving, entering, and/or displaying player tracking information can be provided. In such embodiments, a game controller within the gaming device 104A can communicate with the player tracking server system 110 to send and receive player tracking information.

Figure 2:
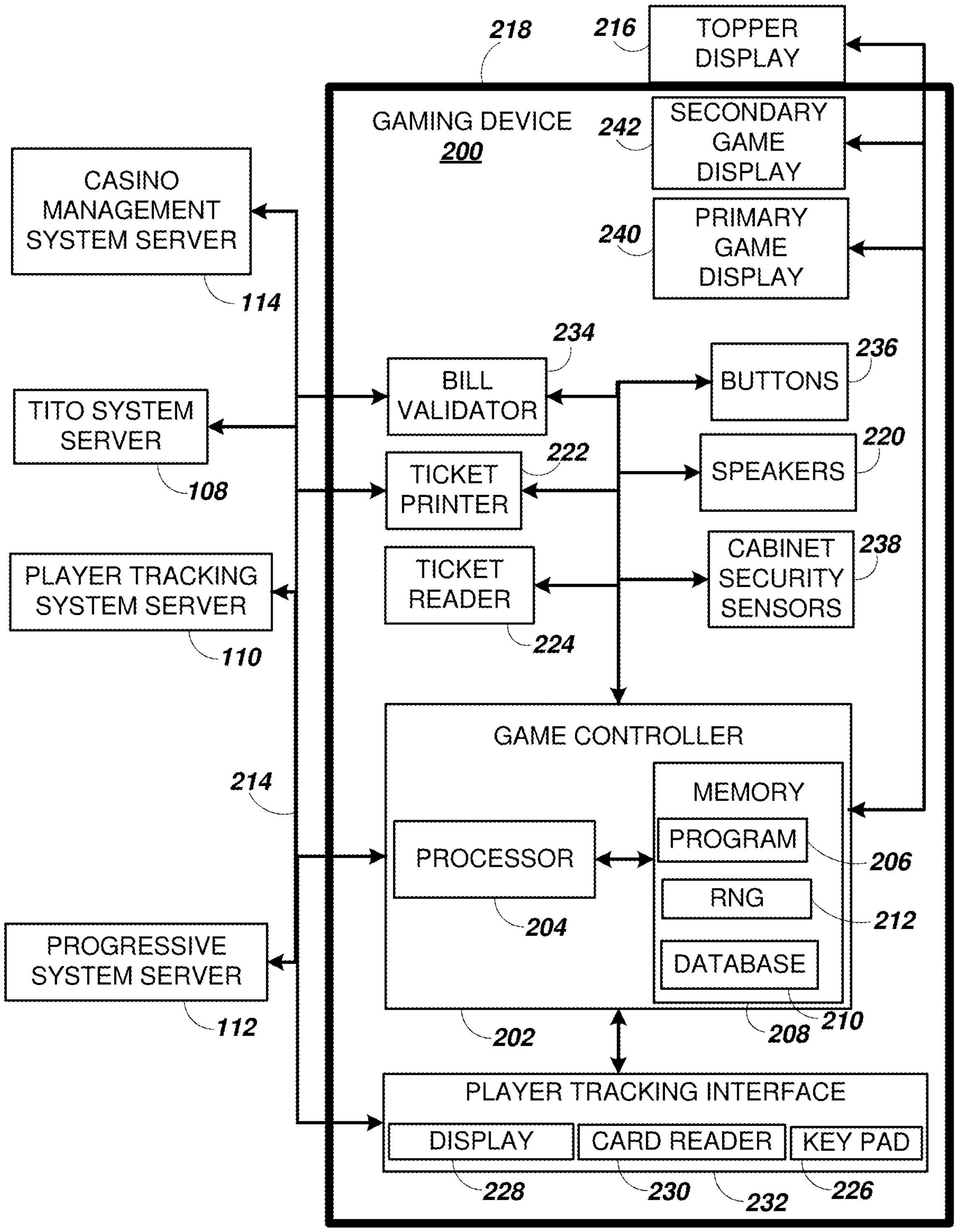
FIG. 2 is a block diagram showing various functional elements of an example electronic gaming machine.

Gaming device 104A may also include physical spinning reels 130 and a handle 132 that is typically mounted to the side of main cabinet 116 and may be used to initiate game play. Many or all of the above described components can be controlled by circuitry (e.g., a gaming controller) housed inside the main cabinet 116 of the gaming device 104A, the details of which are shown in FIG. 2.

In the example gaming device 104A configuration shown in FIG. 1, a bonus topper wheel 134 is included. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game. A candle 138 may be mounted on the top of gaming device 104A and may be activated by a player (e.g., using a switch or one of buttons 122) to indicate to operations staff that gaming device 104A has experienced a malfunction or the player requires service.

An information panel 152 may be a back-lit, silkscreened glass panel with lettering to indicate general game information including, for example, a game denomination (e.g., $0.25 or $1). In some embodiments, the information panel 152 may be implemented as an additional video display.

Note that not all gaming devices suitable for implementing embodiments of the disclosed technologies necessarily include top wheels, top boxes, information panels, cashless ticket systems, and/or player tracking systems. Further, some suitable gaming devices have only a single game display that includes only a mechanical set of reels and/or a video display, while others are designed for bar tables or table tops and have displays that face upwards.

An alternative example embodiment of a gaming device 104B is also illustrated in FIG. 1. The particular example depicted is the Arc™ model gaming device manufactured by Aristocrat® Technologies, Inc. Note that where possible, reference numerals identifying similar features of the gaming device 104A embodiment are also identified in the gaming device 104B embodiment using the same reference numbers.

Example gaming device 104B may include a main cabinet 116 including a main door 118 which opens to provide access to the interior of the gaming device 104B. The main cabinet 116 includes a button deck 120 with buttons 122, a bill validator 124, and a ticket-out printer 126. A main display 128 (e.g., video display monitor) is mounted to, on, or above, the main door 118. The main display 128 can be a high-resolution LCD, plasma, LED, or OLED panel which may be in a portrait orientation with curvature radius from top to bottom as shown. The main display 128, or another display of a gaming device, can include a touchscreen such as a capacitive touchscreen. The bill validator 124 may also function as a "ticket-in" reader for cashless play. A player tracking card reader 144, a transceiver for wireless communication with a player's smartphone, a keypad 146, and/or an illuminated display 148 for reading, receiving, entering, and/or displaying player tracking information is also provided.

Note that gaming device 104B does not include physical reels and instead shows game play functions on main display 128. An optional topper screen 140 may be used as a secondary game display for bonus play, to show game features or attraction activities while the game is not in play, or any other information or media desired by the game designer or operator. In some embodiments, topper screen 140 may also or alternatively be used to display progressive jackpot prizes available to a player during play of gaming device 104B.

Another alternative example embodiment of a gaming device 104C is also shown in FIG. 1. The pictured embodiment is a Helix™ model gaming device manufactured by Aristocrat® Technologies, Inc. As above, where possible, reference numerals identifying similar features of the embodiments of gaming devices 104A and 104B are also identified in gaming device 104C using the same reference numbers.

Example gaming device 104C may include a main cabinet 116 including a main door 118 which opens to provide access to the interior of the gaming device 104C. The main cabinet 116 includes a button deck 120 with buttons 122, a bill validator 124, and a ticket-out printer 126. A main display 128A (e.g., video display monitor) is mounted to, on, or above, the main door 118. The main display 128A can be a high-resolution LCD, plasma, LED, or OLED panel which may be in a portrait orientation with curvature radius from top to bottom as shown. The bill validator 124 may also function as a "ticket-in" reader for cashless play. The gaming device 104C includes a sound system (e.g., speakers 142) for playing game sound effects and music to enhance the player's game play experience. A player tracking card reader 144 and/or a transceiver for wireless communication with a player's smart phone for reading and/or receiving player tracking information is also provided.

Note that gaming device 104C includes a main display 128A that is in a landscape orientation. Although not illustrated by the front view provided, the landscape display 128A has a curvature radius from top to bottom. In some embodiments, display 128A can be a flat panel display. Gaming device 104C does not include physical reels and instead shows game play functions on main display 128A and a secondary display 128B. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-C and other gaming devices. In particular, a gaming device may be operable to provide play of many different instances of games of chance. The instances may be differentiated according to themes, sounds, graphics, type of game (e.g., slot game vs. card game vs. game with aspects of skill), denomination, number of paylines, maximum jackpot, progressive or non-progressive, bonus games, Class 2 or Class 3, etc.

A gaming device suitable for implementing the disclosed technologies may be operable to allow a player to select a game of chance, skill, or combination thereof, to play from a plurality of instances available on the gaming device. For example, a gaming device may provide a menu with a list of the instances of games that are available for play on the gaming device and a player may be able to select from the list a first instance of a game that they wish to play.

Turning now to FIG. 2, a block diagram depicting an example of the internal electronic components of a gaming device 200 connected to external systems is shown. All or parts of the example gaming device 200 shown could be used to implement any one of the example gaming devices 104A-X depicted in FIG. 1. The various instances of games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG 212) that can be implemented in hardware and/or software is typically used to generate random numbers that are used in the operation of game play to ensure that game play outcomes are random and meet regulations for a game of chance.

Alternatively, in some embodiments, a game instance may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When an instance is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits on top of main cabinet 218. In addition to the components described above, either gaming cabinet 218 or topper display 216 also house a number of other components which may be used to add features to a game being played on gaming device 200, including speakers 220, a ticket printer 222 which prints bar-coded tickets, a ticket reader 224 which reads bar-coded tickets, a keypad 226 for entering player tracking information, a player tracking display 228 for displaying player tracking information (e.g., an illuminated or video display), a card reader 230 for receiving data and/or communicating information to and from media or a device such as a smart phone enabling player tracking. Some or all of these components collectively may be referred to as a player tracking interface 232. Ticket printer 222 may be used to print tickets for a TITO system server 108. As indicated above with respect to the gaming devices 104A-104X of FIG. 1, the gaming device 200 can further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play for individual players so that an operator may reward players in a loyalty program. A player uses the player tracking interface 232 that includes player tracking keypad 226, player tracking display 228 and card reader 230, that is typically housed within cabinet 218. Details of example player tracking systems can be found in Patent Pub. No. US 2009/0054139 A1 which is incorporated herein by reference in its entirety and for all purposes.

Those of skill in the art will appreciate that embodiments of the disclosed technologies could be implemented with more or fewer elements than are depicted in FIG. 2. For example, player tracking system server 110 is not a necessary feature of some implementations of the disclosed technologies. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging, and/or free entertainment. Player tracking information may be combined with other information that is now readily obtainable by a casino management system.

Note that the pictured example embodiments of a gaming device 200, as well as example gaming devices 104A-C, are merely a few examples from a wide range of possible gaming device designs on which embodiments of the disclosed technologies may be implemented.

Gaming devices embodying the disclosed technologies can include special features and/or additional circuitry that differentiates them from general-purpose computers (e.g., desktop computers and laptops). Gaming devices, such as gaming devices 104A-X, 200, are highly regulated to ensure fairness and, in many cases, gaming devices 104A-X, 200 are operable to dispense monetary awards (e.g., in the form of a redeemable voucher) of multiple millions of dollars. Therefore, to satisfy security and regulatory requirements in a gaming environment, hardware and software architectures are implemented in gaming devices 104A-X, 200 that differ significantly from those of general-purpose computers. A description of gaming devices 104A-X, 200 relative to general-purpose computing machines and some examples of the additional (or different) components and features found in gaming devices 104A-X, 200 are described below.

Ostensibly, it may superficially seem that adapting general purpose computers to gaming industry applications (i.e., as gaming devices) would be a relatively straightforward proposition because both general purpose computers and gaming devices 200 use processors coupled to a memory to execute stored instructions to receive input, display output, and to control a variety of peripheral devices. However, because of 1) the regulatory requirements for gaming devices 200, 2) the harsh environment in which gaming devices 200 operate, 3) security requirements, and 4) fault tolerance requirements, adapting general purpose computers to function as gaming devices 200 is not simple or straightforward, requires substantial engineering effort, and requires additional hardware not typically found in general purpose computers. Further, techniques and methods for solving a problem in the PC industry, such as device compatibility and connectivity issues, are typically not be adequate in the gaming environment. For instance, a fault or a weakness tolerated in a PC, such as security holes in software or relatively frequent crashes, may not be tolerated in a gaming device 200 because in a gaming device 200 these faults can lead to a direct loss of funds from the gaming device 200, such as stolen cash or loss of revenue when the gaming device 200 is not operating properly.

To illustrate that gaming devices 200 are specially configured gaming hardware and not merely general purpose computers, a few examples of the specialized hardware configuration, as well as differences between PC systems and gaming devices 200, are provided. A first difference between a gaming device 200 and common processor based computer system is that gaming devices 200 are designed to be state-based systems. In a state-based system, the system stores and maintains its current state in a non-volatile memory, such that, in the event of a power failure or other malfunction the gaming device 200 will return to its current state when the power is restored. For instance, if a player was shown an award for a game of chance and, before the award could be provided to the player, the power failed, the gaming device 200, upon the restoration of power, would return to the state where the award is indicated. In contrast, PCs are not state machines and a majority of data is usually lost when a malfunction occurs. This requirement affects the software and hardware design on a gaming device 200.

A second significant difference between gaming devices 200 and common PC based computer systems is that for gaming regulation purposes, the software on the gaming device 200 used to generate the game of chance and operate the gaming device 200 has been designed to be static and monolithic (i.e., immutable) to prevent cheating by the user of gaming device 200. For instance, one solution that has been employed in the gaming industry to prevent cheating and satisfy regulatory requirements has been to manufacture a gaming device 200 that can use a proprietary processor running instructions to generate the game of chance from an EPROM or other form of non-volatile memory. The coding instructions on the EPROM are static (non-changeable) and must be approved by gaming regulators in a particular jurisdiction and installed in the presence of a person representing the gaming jurisdiction. Any changes to any part of the software required to generate the game of chance, such as adding a new device driver used by the game controller to operate a device during generation of the game of chance can require a new EPROM to be produced, approved by the gaming jurisdiction, and reinstalled on the gaming device 200 under the supervision of a gaming regulator. Regardless of whether the EPROM solution is used, to gain approval in most gaming jurisdictions, a gaming device 200 must demonstrate sufficient safeguards that prevent an operator or player of a gaming device 200 from manipulating hardware and software in a manner that gives them an unfair and some cases an illegal advantage.

Further, the gaming device 200 typically includes a means to determine if the code it will execute is valid. If the code is not valid, the gaming device 200 must have a means to prevent the code from being executed. The code validation requirements in the gaming industry affect both hardware and software designs on gaming devices 200.

Even further, a significant difference between a gaming device 200 and common PC based computer systems is the use of a highly sophisticated random number generator (RNG) that is required to be approved to meet strict regulations that prove that outcomes will be statistically independent, uniformly distributed over their range, unpredictable and pass statistical tests such as chi-square test, equidistribution test, gap test, runs test, serial correlation test, etc. Published standards defining tests specified in the regulations of various jurisdictions are developed by organizations such as Gaming Laboratories International LLC (GLI). Consequently, operation of gaming devices 200 involve a mathematical component as well as devices that are not relevant or present in common PC based computer systems. Further, calculation and validation of the return to player percentage is impacted by the RNG.

A third significant difference between gaming devices 200 and common PC based computer systems is that the number and kinds of peripheral devices used on a gaming device 200 are not as widely varying as on PC based computer systems. Typically, in the gaming industry, gaming devices 200 (as compared to PCs) have been relatively restricted in the functionality and peripherals used in that the number of peripheral devices and the number of functions of the gaming device 200 is limited. Further, in operation, the functionality of gaming devices 200 are relatively constant once the gaming device 200 is deployed, i.e., new peripherals devices and new gaming software are infrequently added to a deployed gaming device 200. This differs from a PC where users will continually use different combinations of devices and software from different manufacturers and connect them to their PC to suit their needs depending on a desired application. Therefore, the types of devices connected to a PC may vary greatly from user to user depending in their individual requirements and may vary significantly over time.

Although the variety of devices available for a PC may be greater than on a gaming device 200, gaming devices 200 still have unique device requirements that differ from a PC, such as device security requirements not usually addressed by PCs. For instance, monetary devices, such as coin dispensers, bill validators, and ticket printers and computing devices that are used to govern the input and output of cash to a gaming device 200 have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming devices 200 that are not typically found in general purpose computing devices such as PCs. These hardware/software components and architectures, as described below in more detail, include but are not limited to watchdog timers, voltage monitoring systems, state-based software architecture and supporting hardware, specialized communication interfaces, security monitoring, and trusted memory.

A watchdog timer is normally used in gaming devices 200 to provide a software failure detection mechanism. In contrast to a general purpose operating system, the operating software of a gaming device periodically accesses control registers in the watchdog timer subsystem to "re-trigger" the watchdog. Should the gaming device operating software fail to access the control registers within a preset timeframe, the watchdog timer will timeout and generate a system reset. Typical watchdog timer circuits for gaming devices contain a loadable timeout counter register to allow the operating software to set the timeout interval within a certain range of time. A differentiating feature of some gaming device circuits is that the operating software cannot completely disable the function of the watchdog timer. In other words, the watchdog timer always functions from the time power is applied to the gaming device 200 board.

Gaming device 200 platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming device 200. Gaming devices 200 typically have power supplies with tighter voltage margins than that required by the operating circuitry. In addition, the voltage monitoring circuitry implemented in gaming devices 200 typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the gaming device 200.

As mentioned above, the standard method of operation for gaming device software is to use a state machine. Different functions of the game (e.g., bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming device 200.

In general, unlike typical general-purpose computers, the gaming device 200 does not advance from a current state to a subsequent state until critical information that allows the current state to be reconstructed is stored. This feature allows the game to recover operation to the current state of play in the event of a malfunction, loss of power, etc. that occurred just prior to the malfunction. After the state of the gaming device 200 is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not normally present in typical general-purpose computers, and if present, are not used in this manner.

As described in the preceding paragraph, when a malfunction occurs during a game of chance, the gaming device 200 may be restored to a state in the game of chance just prior to when the malfunction occurred. The restored state may include metering information and graphical information that was displayed on the gaming device 200 in the state prior to the malfunction. For example, when the malfunction occurs during the play of a card game after the cards have been dealt, the gaming device 200 may be restored with the cards that were previously displayed as part of the card game. As another example, a bonus game may be triggered during the play of a game of chance where a player is required to make a number of selections on a video display screen. When a malfunction occurs after the player has made one or more selections, the gaming device 200 may be restored to a state that shows the graphical presentation at the moment just prior to the malfunction including an indication of selections that have already been made by the player. In general, the gaming device 200 may be restored to any state in a plurality of states that occur in the game of chance that occurs while the game of chance is played or to states that occur between plays of the game.

Game history information regarding previous games played, such as an amount wagered, the outcome of the game, and so forth, may also be stored in a non-volatile memory device. The information stored in the non-volatile memory may be detailed enough to reconstruct all or a portion of the graphical presentation that was previously presented on the gaming device 200 and the state of the gaming device 200 (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming device 200 prior, during and/or after the disputed game to demonstrate whether the player was correct or not in their assertion.

Another feature of gaming devices 200, such as gaming devices 104A-X, is that they often contain unique interfaces, including serial interfaces, to connect to specific subsystems internal and external to the gaming devices. The serial devices may have electrical interface requirements that differ from the "standard" EIA 146 serial interfaces provided by general-purpose computers. These interfaces may include the Electronic Industries Alliance's EIA-485 standard, EIA-422 standard, fiber optic, optically coupled serial interfaces, current loop style serial interfaces, etc. In addition, to minimize the required number of serial interfaces internally in the gaming device, serial devices may be connected in a shared, bus, and/or daisy-chain fashion where multiple peripheral devices are connected to a single serial (or other protocol) channel.

The serial interfaces may be used to transmit information using communication protocols that are unique to the gaming industry. For example, the OASIS™ system manufactured by Aristocrat® Technologies, Inc. includes a proprietary communication protocol used for serial communication between gaming devices. As another example, the SAS (Slot Accounting System), manufactured by International Game Technology PLC, includes a communication protocol used to transmit information, such as metering information, from a gaming device 200 to a remote device. Often SAS is used in conjunction with a player tracking system.

Gaming devices 200 may alternatively be treated as peripheral devices to a casino communication controller and connected in a shared daisy-chain fashion to a single serial interface. In both cases, the peripheral devices are preferably assigned device addresses. If so, the serial controller circuitry implements a method to generate or detect unique device addresses. General-purpose computer serial ports are not able to do this.

Security monitoring circuits detect intrusion into a gaming device 200 by monitoring security sensors 238 or switches attached to access doors (including the main door) of the main cabinet 218 of the gaming device 200. Preferably, access violations result in suspension of game play and can trigger additional security operations to preserve the current state of game play. These circuits also function when power is off by use of a battery backup. In power-off operation, these circuits continue to monitor the access doors (including the main door) of the gaming device 200. When power is restored, the gaming device 200 can determine whether any security violations occurred while power was off, e.g., via software for reading status registers. This can trigger event log entries and further data authentication operations by the gaming device software.

Trusted memory devices may be included in a gaming device 200 game controller to ensure the authenticity of the software that may be stored on less secure memory subsystems, such as mass storage devices. Trusted memory devices and controlling circuitry are typically designed to not allow modification of the code and data stored in the memory device while the memory device is installed in the gaming device. The code and data stored in these devices may include authentication algorithms, random number generators, authentication keys, operating system kernels, etc. The purpose of these trusted memory devices is to provide gaming regulatory authorities a root trusted authority within the computing environment of the gaming device that can be tracked and verified as original. This may be accomplished via removal of the trusted memory device from the gaming device 200 and verification of the secure memory device contents by a separate third-party verification device. Once the trusted memory device is verified as authentic and based on the approval of the verification algorithms contained in the trusted device, the gaming device 200 is allowed to verify the authenticity of additional code and data that may be located in the game controller 202, such as code and data stored on hard disk drives. Details related to trusted memory devices that may be used in the disclosed technologies are described in U.S. Pat. No. 6,685,567 titled "Process Verification," which is incorporated herein by reference in its entirety and for all purposes.

Mass storage devices used in a general-purpose computer typically allow code and data to be read from and written to the mass storage device. In a gaming system environment, modification of the gaming code stored on a mass storage device is strictly controlled and would only be allowed under specific maintenance type events with electronic and physical enablers required. Though this level of security could be provided by software, gaming devices 200 that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

Although the system shown in FIG. 2 illustrates one specific example gaming device 200 of the disclosed technologies, it is by no means the only gaming device architecture on which the disclosed technologies can be implemented. For example, an architecture having a single processor that handles communications as well as routing computations, etc. may be used. Further, other types of interfaces and media could also be used with the gaming device 200. The communication path between components may be bus based (as shown in FIG. 2) or switch fabric based (such as a cross-bar).

Example 5—Example Electronic Gaming Machine with Movable Player Interface

Figure 3A:
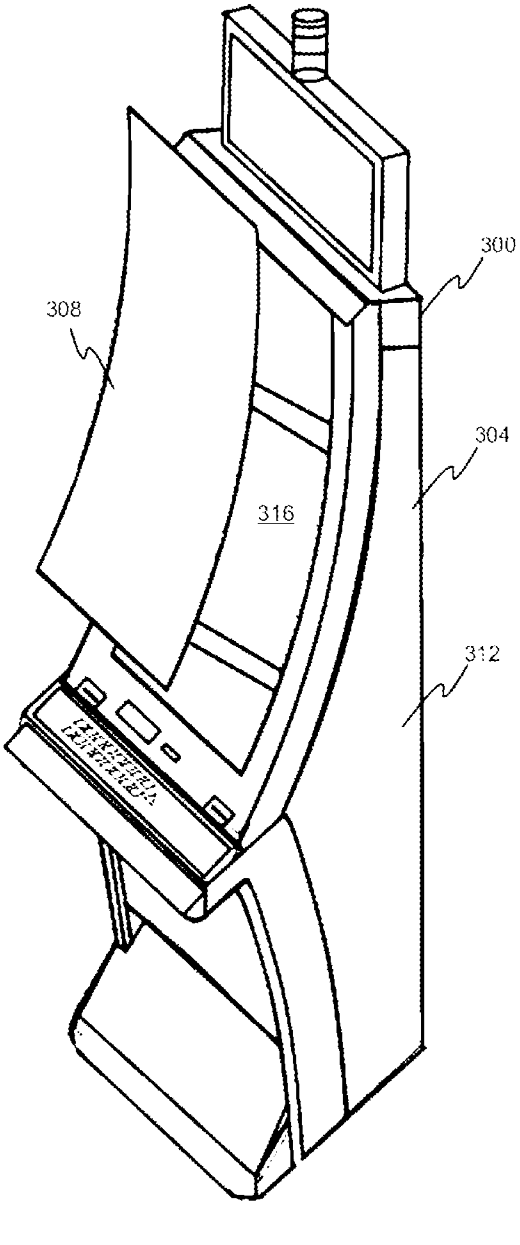
FIGS. 3A and 3B provide example electronic gaming machines.

FIG. 3A depicts an exemplary electronic gaming machine 300 (similar to gaming machines 104A, 104B, and 104C). In the embodiment shown, the electronic gaming machine 300 includes a cabinet 304 (similar to the main cabinet 218 of FIG. 2) and a movable player interface 308. The movable player interface 308 can include the gaming display area 118 of FIG. 1, including the main display area 128 (which can include the main display 128*a* or the secondary display 128*b*). Movable player interface 308 can also include the topper screen 140, or other gaming displays, when included and as desired. In some cases all of these displays may form part of the movable player interface 308, while in other cases some of the displays may not be movable. When multiple displays or display portions are part of the movable player interface 308, they can move together as a unit, in some cases, while in other cases two or more of the displays can be moved independently.

Figure 3B:
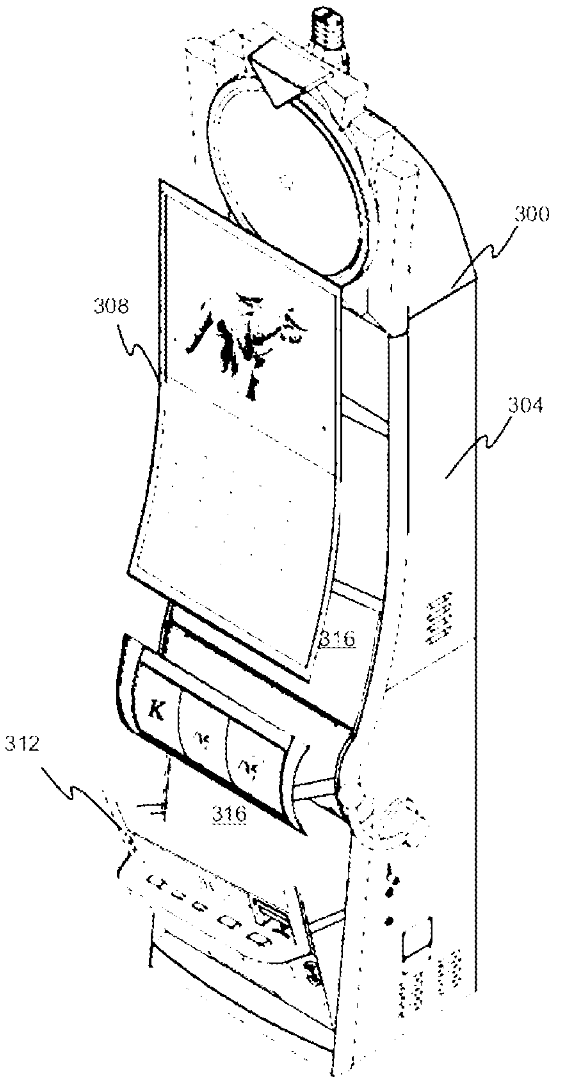

The cabinet 304 may include a plurality of doors. For example, the cabinet 304 may include a main door 312 (similar to the main door 116 of FIG. 1). FIG. 3B depicts another exemplary electronic gaming machines 300, wherein like numerals refer to like parts.

The gaming machines 300 can include a variety of sensors, which can be mechanical sensors (e.g., switches), where mechanical movement or contact generates or alters a signal. Mechanical sensors can include devices that measure pressure, force, torque, or flow, including strain gauges. Mechanical sensors can include piezoresistive sensors, piezoelectric sensors, capacitive sensors, inductive sensors, resonant sensors, other sensors, or combinations thereof. Capacitive sensors can include touchscreens, such as a touchscreen incorporated into an EGM 300, or a component in communication with an EGM 300, including the movable player interface 308.

The sensors can also be positional sensors, such as an inertial measurement unit (IMU) or components that can be included in an IMU, such as accelerometers, gyroscopes, magnetometers, and combinations thereof. Sensors can also include radiation sensors, such as infrared or visible light sensors, or ultrasonic sensors. Cameras, still or video, can also be used as sensors. Electrical sensors can be included in an EGM 300, such as to detect when a door is opened or closed through the opening and closing of a circuit, or to detect whether a component is connected, such as through being able to send data to, or receive data from, such a component, or by detecting the presence of voltage or current on a particular line, circuit, pin, etc.

As will be described in more detail, sensors can be used to determine various states of an EGM 300 and its constituent components. These sensors can be useful when physically moving or manipulating an EGM 300, or when diagnosing or repairing an EGM. For example, the cabinet 304 can include a sensor that registers when the movable player interface 308 or the door 312 are manipulated. Through a sensor or a combination of sensors the physical or other (e.g., electrical) relationship between two more components of an EGM 300 may be determined. Or, such a relationship can be determined between an EGM and another component (e.g., a progressive server or a display device associated with a progressive game or another type of device). The one or more sensors can be used to determine whether two or more components are physically or electrically coupled, or if one component is offset from another, including, at least in some cases, a direction and a degree (which can be a relative degree, such as "close" or "far," or a quantified degree, such as being vertically offset by three inches).

A display associated with the EGM 300, such as the movable player interface 308 or another display (e.g., a display associated with a topper display, such as the topper display 140 of FIG. 1, the topper display 216 of FIG. 2, a button panel 120 that includes a display providing a virtual button panel, or a display associated with one of the server computers 102 of FIG. 1), can be used to display information that is not related to gameplay. For instance, the displays can be used to facilitate the installation, removal, repair, maintenance, or upgrade of an EGM 300. In at least some embodiments, information can be displayed based at least in part on information received from one or more sensors associated with an EGM 300.

In some embodiments, the EGM 300 includes a controller (not shown, similar to the game controller 202 as shown in FIG. 2) and a memory (not shown, but similar to the memory 208 of FIG. 2). As will be described in more detail, the memory can store service materials, including, but are not limited to, instruction manuals, repair manuals, and technical bulletins, and may also store information specific to the game machine 300 to help ensure safe interaction with the technician and/or protect components of the game machine 300. Such safety-related information can include safety warnings, locations of pinch points, and information regarding center of gravity for equipment manipulated by the operator or technician. In some embodiments, the controller may perform a process of self-diagnosis when the door 312 is opened. The memory 208 may also store other executable codes that include software that may display not only warning and safety information, but also tech bulletins for field services as required, and as further described below.

During a self-diagnosis process that may occur during installation or repair, the player interface 308 may also display to the operator or technician an indicator of a specific repair that is needed, may identify a part for replacement, or may display a particular portion of a step-by-step repair instructions for action to be taken and technical bulletins related to any technical issues identified by the process of self-diagnosis, for example. Such information may be remotely communicated between the gaming machine 300 and a field office prior to, or in conjunction with, an installation or repair service operation. Such information could be communicated the gaming machine 300 and other devices, mobile phones (not shown), via various communication means.

Further, when the door 312 is opened or unlocked, the controller may trigger or initiate the player interface 308 to display non-game images or information. Specifically, the player interface 308 may include a touchscreen display. When the player interface 308 is moved, or when the door 312 is opened exposing the interior 316 of the electronic gaming machine 300 for servicing, the touchscreen display may display information, such as machine-specific information. The information display can be menu-driven or can include searchable technical service bulletins. The information display can retrieve suitable information from the memory 208. The player interface 308 may also display machine-specific safety warnings. For example, the machine-specific safety warnings may include, but are not limited to, pinch points, machine center of gravity, and the like, directly. Such a configuration may be used with installation of the gaming machine 300 alone, in connection with other gaming machines 300, or other signage installed or serviced with such gaming machines 300.

In some embodiments, the bulletins are searchable. That is, the operator may use the player interface 308 or another input device to search for relevant technical information. In some other embodiments, the player interface 308 or another display may animate or display photographs of relevant components, safety warnings, part numbers, or other information. The bulletins and other information stored on, or communicated to, the game machine 300 for installation and/or repair service may be updated real-time, in some embodiments. In other embodiments, the bulletins or other information can be periodically updated, such as by replacing or modifying computer-media of the EGM 300.

The cabinet 304 may include audio speakers such as the speakers 220. In this way, the controller may control the speakers 220 to provide audio guidance to the operator through part or all of the servicing of the electronic gaming machine 300.

By way of example, during an installation or a service call, an operator or technician can access the EGM 300, such as a using key that can unlock the door 312. The player interface 308 may also be moved, exposing an interior 316 of the electronic gaming machine 300, such as for servicing. When the interior 316 is exposed, the operator or technician may gain access to components of the electronic gaming machine 300 for servicing and maintenance. Once the operator or technician unlocks the door 312 or opens the door 312, for example, the player interface 308 may be activated to display special images, warnings, or instructions, described below, associated with the installation or a service call of game machine 300. The player interface 308 may be activated similarly, by other ways, e.g., by the controller or by the technician or operated by other actions, as well.

Example 6—Example Electronic Gaming Machine with Supplemental Information

Figure 4:
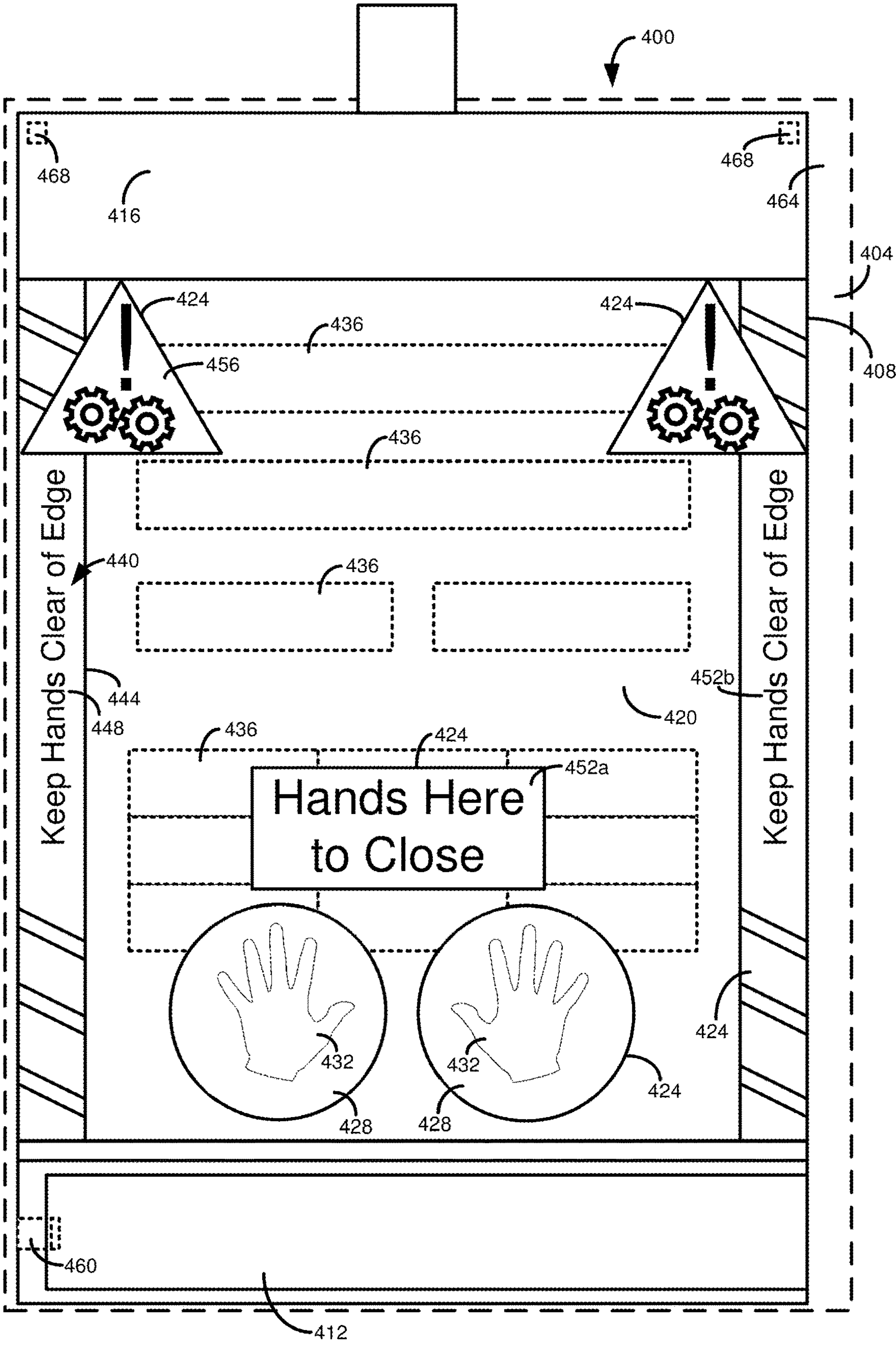
FIG. 4 is a diagram of an electronic gaming machine with example supplemental information displayed thereon.

FIG. 4 illustrates an example electronic gaming machine (EGM) 400. The EGM 400 can have a cabinet section 404, a primary display 420, a door 412 in the cabinet section 404, and a topper display 416. One or both of the primary display 420 and the topper display 416 can form part of a movable player interface 408.

One or more of the displays 416, 420 of the movable player interface 408 can be used to display non-gaming related information, such as information that facilitates installation, upgrade, repair, removal, or maintenance of the EGM 400. The non-gaming information can include warning information or notices, or instructional content. The non-gaming information can be referred to as secondary, supplemental, or auxiliary information or content, since it does not provide, or relate to, game play features, which is the primary purpose of the EGM 400, the displays 416, 420, and the movable player interface 408. The supplemental information can also include information regarding undesired interactions with the EGM 400, such as if it is detected that an individual (or agent, such as an external computing device) has tried to tamper with the EGM. In the event a tampering-type event is determined, the EGM 400 can cause a display 416, 420 to call attention to the tampering, as well as taking other actions, such as providing audio feedback related to the tampering (e.g., sounding a buzzer or alarm) or stopping game play functionality of the EGM.

In some cases, the supplemental information displayed can be selected by a user, such as when a user wishes to perform a specific procedure. However, the supplemental information can also be automatically displayed. In particular examples, a EGM 400 is capable of displaying multiple types of supplemental information or displaying particular supplemental information from a set of supplemental information. Particular supplemental information can be selected for display (or other output, such as audio or haptic output) based on signals detected by the EGM 400. For instance, particular sensor readings, movements detected, and other information, including particular combinations, may be used to determine what, if any, supplemental content is output by the EGM 400. As an example, first content may be displayed when a door of the EGM 400 is determined to be open, while second content may be displayed based on a user role when a user ID tag is determined to be proximate the EGM (e.g., as detected by a RFID sensor). During a service procedure, supplemental content may be progressively displayed as the EGM 400 determines that various actions associated with the procedure have been performed.

As well as being tailored to a specific scenario (e.g., repair, maintenance, or upgrade procedure, tampering condition, sensing that a particular component has been opened or accessed, or in response to particular sensor readings), supplemental information can be tailored to a particular user. In some cases, a user can enter a user identifier into the EGM 400, such as via the movable player interface 408 or another input component. The user identifier can be associated with a user role. Different users, or different user roles, may be provided with different information content on a display 416, 420. For instance, a user responsible for performing maintenance on a ticketing system may need different information than a user responsible for installing or removing an EGM 400, or a user performing more complex upgrades or repairs on the EGM. User identifiers or role identifiers can be determined in other manners, such as by using a sensor of the EGM 400 (such as a RFID sensor) to detect a badge or other identifier worn by a user and using such information to retrieve information that should be displayed to that particular user based on their identity, role, or combination thereof.

Although the following discussion primarily relates to supplemental information output by the EGM 400, it should be appreciated that input to the EGM may also be of interest. In particular, user interactions with the EGM 400 can be logged, as well as being used for determining supplemental content to be displayed by the EGM 400 (or components associated or in communication with the EGM, such as a progressive jackpot server or a display associated with a progressive jackpot). For example, the EGM 400 can log sensed events, such as sensors activated, or components that were manipulated, added, or removed. In particular, the EGM 400 can log user interactions with the movable player interface 408, including portions that were touched by a user, and optionally more granular information, such as an area of contact (e.g., was the contact by a finger or a hand, which can be a specific size or shape of an area of the movable player interface), a duration of contact, and an applied pressure or force. When the interactions are associated with user input (e.g., selections of choices displayed to a user on a user interface, information entered by a user, such as through a displayed keyboard, other user interface elements that were selected or activated by a user, and optionally a value associated with such selection or activation), an identifier of an activated or selected user input element can be recorded and associated with the input event, and optionally a value associated with the interaction. The value can be, for example, text input by a user, a value of an adjustable UI element (such as a value represented by virtual dial or associated with a slider-type control).

Logged information can be used for various purposes, including tracking actions performed on the EGM 400, such as to provide a record of when various components of the EGM were updated, replaced, repaired, or otherwise manipulated or altered by a user. In the event of an injury to a user of the EGM 400, such as a technician, damage to the EGM, or for other purposes, logged interactions can be reviewed. Such review can include determining whether a user complied with warnings or instructional information that was displayed to the user. Reviewing prior interactions may also be useful in determining whether additional actions, such as repair or replacement activities, should be performed, or to diagnose performance issues associated with the EGM 400. In some embodiments, a controller of the EGM 400 may also transmit the logs for remote access.

As shown, supplemental information 424 is displayed on the primary display 420. The supplemental information 424 in FIG. 4 includes warning information, information regarding handling precautions a user should take, as well as instructional content that guides a user in performing one or more actions, such as securing (e.g., closing) the movable player interface 408 to the cabinet section 404. The supplemental information 424 can take various forms, but is shown as including handling guide 428, in the form of images of a pair of hands. The supplemental information, including the handing guide 428, can represent actions that a user should, or should not, perform to accomplish a particular result.

For instance, if the user desires to open the door 412, or open the movable player interface 408, a display (416, 420, or another display) associated with the EGM 400 can provide a handling guide 428 indicating where a user should push or slide to open the door or movable player interface. A display can display handling guides 428 that indicate the positions of latches, locks, clips, tabs, and other mechanisms that secure portions of the EGM 400 together, and can display information (which can include static images, animations, video, or a combination thereof) that may assist a user in manipulating components of the EGM to accomplish a result (e.g., showing an animation of where to locate a particular component and how it should be rotated, pulled, pushed, or otherwise manipulated to accomplish a desired result).

Similar information can be shown when the user wishes, or should, perform other actions, such as closing the door 412 or closing the movable player interface 408 (e.g., seating the interface against another component, such as a frame portion, of the cabinet section 404). In this scenario, the handling guide 428 can be in the form of a pair of hands 432 illustrating where on the EGM 400 the user should place their hands in order to close the movable player interface 408. Providing such guidance can reduce the amount of training a user needs to perform actions, and can minimize the effort needed to accomplish an action (e.g., less pushing force need be used), which can help prevent injury to the user or damage to the EGM 400.

The handling guide 428 can be presented in a visually distinct style, such as bright, bold, or vivid colors, to help distinguish the guide from other elements shown on a display. For instance, as shown in FIG. 4, when the handling guide 428 is shown, gaming elements 436 can be continued to be displayed, but in a faded or background manner. In other implementations, the gaming elements 436 can cease to be displayed when the handling guide 428 is being displayed. However, these considerations do not preclude the gaming elements 436 from being shown in a different, including a normal, manner when the handling guide 428 is displayed, or the handling guide being shown in a similar manner as the gaming elements (e.g., not being shown in a style that is brighter, more vivid, or bolder than the gaming elements).

In scenarios where the movable player interface 408 is a touchscreen, such as a capacitive touchscreen, or otherwise includes sensors that can detect user interaction, the display of the handling guide 428 can be adjusted to indicate whether the user has correctly follow the handling guide. For instance, if the user places their hands on the appropriate location for the handling guide 428, visible feedback (e.g., flashing, changing color, display of a check mark or other indication of success, or removing or moving the handling guide) can be provided, or, audio or other feedback (e.g., haptic, such as a vibration) can be provided instead of, or in addition to, the visible feedback. Similarly, visual, audio, haptic, other feedback, or a combination thereof can be provided to indicate that a user has not correctly followed the handling guide 428 (e.g., the user's hands are misaligned, such as being too far from, or too close to, an appropriate location), such as displaying the handling guide 428 in red (instead of, for example, green for correctness), flashing the handling guide, sounding a buzzer, or a combination thereof.

In some embodiments, the handling guide 428 can provide feedback to help a user modify their interaction to achieve a result. For instance, the handling guide 428 can display instructions to a user (e.g., "move hands to the left") or can display correct and incorrect interactions in different visual manners (e.g., displaying areas with correctly applied forces in green and areas with incorrectly applied forces in red). Certain handling guides 428 can include pressure sensitivity, and the handling guide 428 can assist a user in applying a correct amount of force. The handling guide 428 can pulse or flash at different frequencies or in different patterns in order to guide a user to apply more or less pressure. Or, the handling guide 428 can display text (e.g., "push harder") or other types of visual indications to guide a use interacting with the EGM 400 to achieve a desired result.

The supplemental information 424 can include indications 440 of areas where a user should avoid contact. These areas can be, for example, area where sharp edges are present, pinch points (e.g., where a user's fingers or hands may become lodged between two components of the EGM 400), where shock risks may be present, or where applying a force (e.g., the application of uneven forces or forces about a center of gravity of the EGM) could result in damage to the EGM 400, such as by causing the EGM to topple over. FIG. 4 shows the edges 444 of the movable player interface 408 with warning banners 448. As with the handling guide 428, the warning banners 448 can be displayed in a different visual style than other elements shown on the movable player interface 408, including the gaming elements 436. Visual elements or styles understood to be associated with warnings or danger (e.g., striping 450, showing the warning banners 448 in colors such as red, yellow, or black), can be used to help call attention to aspects of the supplemental information 424. As with incorrect interactions with the handling guide 428, improper interaction with an area of the movable user interface 408 associated with the indications 440 can result in the EGM 400 providing feedback (e.g., visual, audio, haptic, or a combination thereof) that the user should cease or alter their actions.

The handling guide 428, or other types of supplemental information 424, can be useful for a variety of reasons. For example, an EGM 400 may be used in an environment where a variety of languages are spoken. Providing the handling guide 428 can allow important information to be conveyed in a way that is not, or at least less, dependent on a particular language. This independency may also assist in information being conveyed in a more readily understood and assimilated manner (e.g., reducing the risk of miscommunication or misunderstanding), which can be particularly important when the supplemental information 424 relates to warnings or safety information.

The supplemental information 424 can include text or other visual elements 452 to help explain other aspects of the supplemental information, such as the handling guide 428 and the indicators 440. For instance, text 452*a*, "Hands Here to Close," explains the purpose of the hands 432. Text 452*b*, "Keep Hands Clear of Edge," explains the purpose of the striping 450. The supplemental information 424 can include elements 456 that do no serve to provide specific guidance to a user, but can help indicate that the user should proceed with caution, that the potential for injury exists, or that supplemental information 424 is present and the user should be alert for such information.

As explained above, the supplemental information 424 can be displayed at various times and in response to various activities or conditions. The supplemental information 424 may also adapt based on such times and activities or conditions. For instance, FIG. 4 illustrates a sensor 460 in communication with the door 412. The sensor 460 can detect when the door 412 is open or closed. If a condition is detected that a user wishes to open the door 412 (e.g., in response to a user entering a command via the movable user interface 408, by placing a key in a lock associated with the door, or through other action), the supplemental information 424 can relate to information helpful in opening the door. When the door 412 is open, the supplemental information 424 can relate to hazards that might exist when the door is open, or can provide information relevant to closing the door (e.g., by showing the hands 432 in the position shown in FIG. 4).

The supplemental information 424 can be displayed for various amounts of time. In at least some cases, the supplemental information 424 is displayed until a terminating condition is encountered. A terminating condition can be a condition where it is determined, such as using a sensor, that a condition that resulted in the display of the supplemental information 424 is no longer present. In the example of the door sensor 460, the supplemental information 424 can be displayed until the sensor 460 detects that the door 412 is closed. Or, the supplemental information 424 can be displayed until a user provides an indication that the supplemental information should no longer be displayed (e.g., selects an "OK" or "reset" icon displayed on the movable user display 408).

As another example, an upper portion 464 of the cabinet section 404 can include one or more sensors 468, such as accelerometers. The sensors 468 can be used to determine a degree of tilt or shaking of the EGM 400. For instance, the EGM 400 may be constructed such that the EGM may tip over if the EGM is rotated too far from a vertical position. If the sensors 468 detect that the EGM 400 is tilted or is being rocked, the supplemental information 424 can include text or other visual information to indicate that the EGM is tiled and that there is a danger of the EGM toppling over. The supplemental information 424 can also include visual elements to indicate a degree of tilt, such as an angle, or information that can be readily understood, such as meter or bar that represents greater tilt as meter or bar segments are filled, or through the use of colored indicators (e.g., red for high tilt/danger, green for no tilt, yellow for caution) or indictors that flash or pulse more quickly as greater tilt occurs.

In some cases, a single user interaction, such as a physical interaction (e.g., pushing, sliding, or otherwise manipulating a component) of an EGM 400 may be sufficient to accomplish a desired result. In other cases, a result may be accomplished using a sequence of two or more discrete actions. The present disclosure can provide displays that facilitate the completion of such a sequence.

Although the supplemental information 424 has been described as associated with the EGM 400, it should be appreciated that the supplemental information may be presented on, or regarding, other devices or components that relate to the EGM. For instance, a display 416, 420 of the EGM 400 can present information regarding a progressive controller (such as controlling a jackpot that is available from multiple EGMs) or other supplemental gaming device. Or, a display associated with a progressive controller or other supplemental gaming device can be used to display information relating to the EGM 400.

Typically, the supplemental information 424 is stored on the EGM 400, such in memory or in secondary storage. In some cases, the supplemental information 424 is stored in read-only memory or maintained in secondary storage such that the supplemental information is not remotely-alterable (e.g., over a network connection). Having non-remotely-alterable information can be important, such as in regulated environments. In this scenario, the supplemental information 424 can be updated by replacing components of the EGM 400 or by locally accessing computer readable media storing the supplemental information. In other embodiments, all or a portion of the supplemental information 424 may be modified more easily, including remotely, such as over a network.

The supplemental information 424 has been described as being rendered on a display. In some cases, at least a portion of the supplemental information 424 can be associated with the EGM 400 in another manner. For example, a sticker having the supplemental information 424 may be placed over the movable player interface 408. The sticker may allow the supplemental information 424, such as warning information, to be conveyed to a user before the displays 416, 420 are available (e.g., before the EGM 400 is "plugged in"). Supplemental information 424 displayed on a display 416, 420 can help ensure that important information is conveyable to a user after the sticker is removed.

Although the display of supplemental information in this Example 6 has been described with respect to the displays 416, 420 of the EGM 400, it should be appreciated that the disclosed technologies, in this Example 4 or the other Examples provided herein, can be incorporated into other displays of an EGM 400, or displays that are in communication with the EGM. For example, supplemental information can be displayed on a button deck 120 of a gaming device 104A-104C of FIG. 1, where the button deck includes a display providing a virtual button deck.

Example 7—Example Sequence of Supplemental Information

Figure 5C:
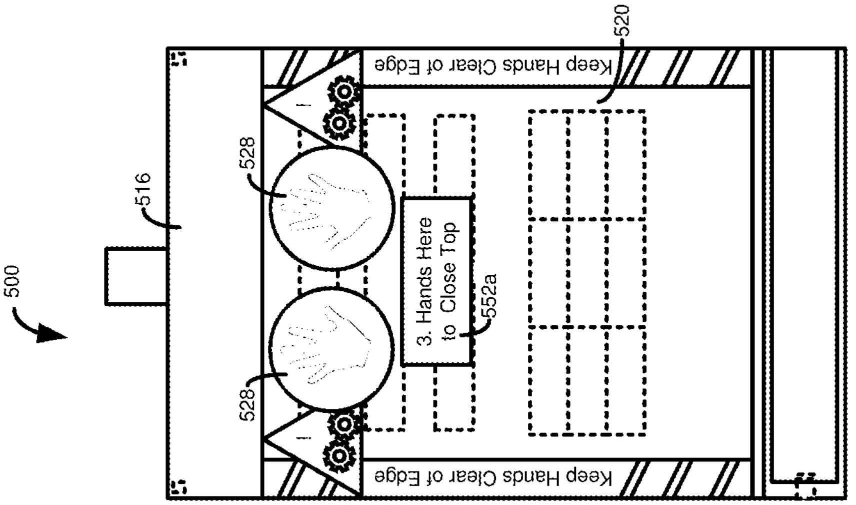
FIGS. 5A-5C are diagrams illustrating supplemental information being rendered sequentially on an electronic gaming machine in response to user interaction with the electronic gaming machine.
Figure 5B:
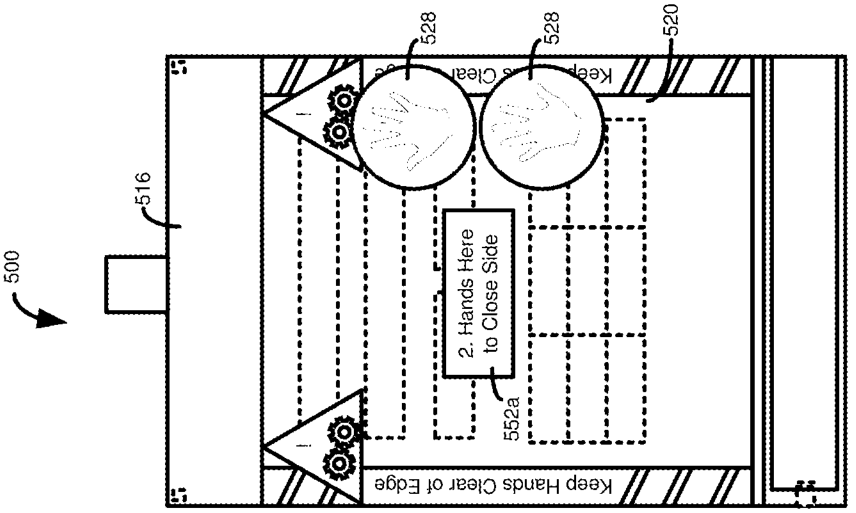
Figure 5A:
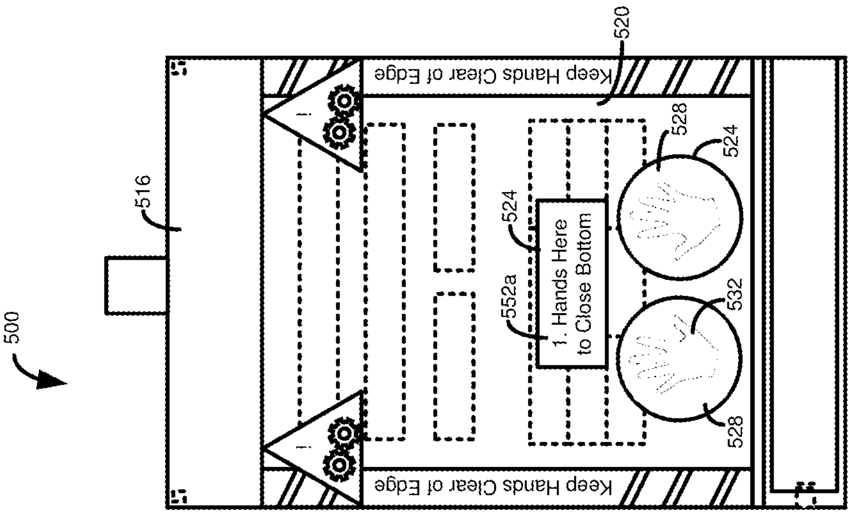

FIGS. 5A-5C illustrate an EGM 500 where a display 520 displays a sequence of supplemental information 524 as the user manipulates the EGM. The EGM 500 can be at least generally similar to the EGM 400 of FIG. 4, and thus not all components of the EGM are described again in significant detail. Unless otherwise indicated, a component discussed in conjunction with the EGM 500 can be at least similar to the analogous component of the EGM 400.

FIG. 5A shows the EGM 500 in substantially the same configuration as the EGM 400. However, text 552*a* of supplemental information 524 has a "1" to indicate that it is the first in a series or sequence of steps. The EGM 500 can include sensors to detect when the action associated with the text 552*a* has been accomplished. In some cases, the sensors can detect when at least a portion of a movable player interface 508 has an appropriate position or relation with another component, such as a latch being engaged. In another implementation, the sensor can include a touchscreen forming part of the movable user interface 508, where the touchscreen detects when the user has placed their hands on the hands 532. If the user places their hands in a position other than as indicated by the hands 532, the sequence does not proceed to the next step, but other actions can be taken, such as displaying a warning or text indicating how the step should be correctly performed.

If the EGM 500 detects that the action indicated by the handling guide 428 has been completed, EGM 500 can proceed to the configuration illustrated in FIG. 5B, such as by changing information displayed on a display 516, 520. The action associated with FIG. 5A may be securing a bottom or lower portion of the movable player interface 508. An action association with FIG. 5B may be securing a right side of the movable player interface 508. To assist a user in taking the appropriate action, the position of the handling guide 528 can be altered (e.g., displayed on a different position of the display 520). Other portions of the supplemental information 524 can be altered, such as the content, position, or other features of the text 552*a*.

As shown in FIG. 5B, the handling guide 528 has move moved to the right side of the movable player interface 508, such as where pressure may be most efficiently applied in order to activate a latching mechanism. The text 552*a* can be altered to indicate that the text represents the second step in the procedure, and can be updated to reflect the next action to be taken by a user—"Hands Here to Close Side." The EGM 500 can maintain the display configuration of FIG. 5B until it is detected by the EGM (e.g., by a controller or a processor associated with the EGM) that the user has successfully completed the action associated with FIG. 5B—securing a right side of the movable player interface 508. The EGM 500 can then proceed to display the information as shown in FIG. 5C.

FIG. 5C shows the EGM 500 with the handling guide 528 located at an upper portion of the movable player interface 508. The handling guide 528 may be shown at a position where pressure may be most efficiently applied in order to activate a latching mechanism. The text 552*a* can be altered to indicate that the text represents the third step in the procedure, and can be updated to reflect the next action to be taken by a user—"Hands Here to Close Top." The EGM 500 can maintain the display configuration of FIG. 5C until it is detected by the EGM 500 that the user has successfully completed the action associated with FIG. 5C—securing a top portion of the movable player interface. In the event that the procedure is complete after performing the action in FIG. 5C, the supplemental information 524 can be removed from the display 520. In addition, or alternatively, a completion indicator can be displayed on the EGM 500 to confirm to a user that the procedure was successfully completed.

Example 8—Example Supplemental Information Displayed on Multiple Displays

Figure 6:
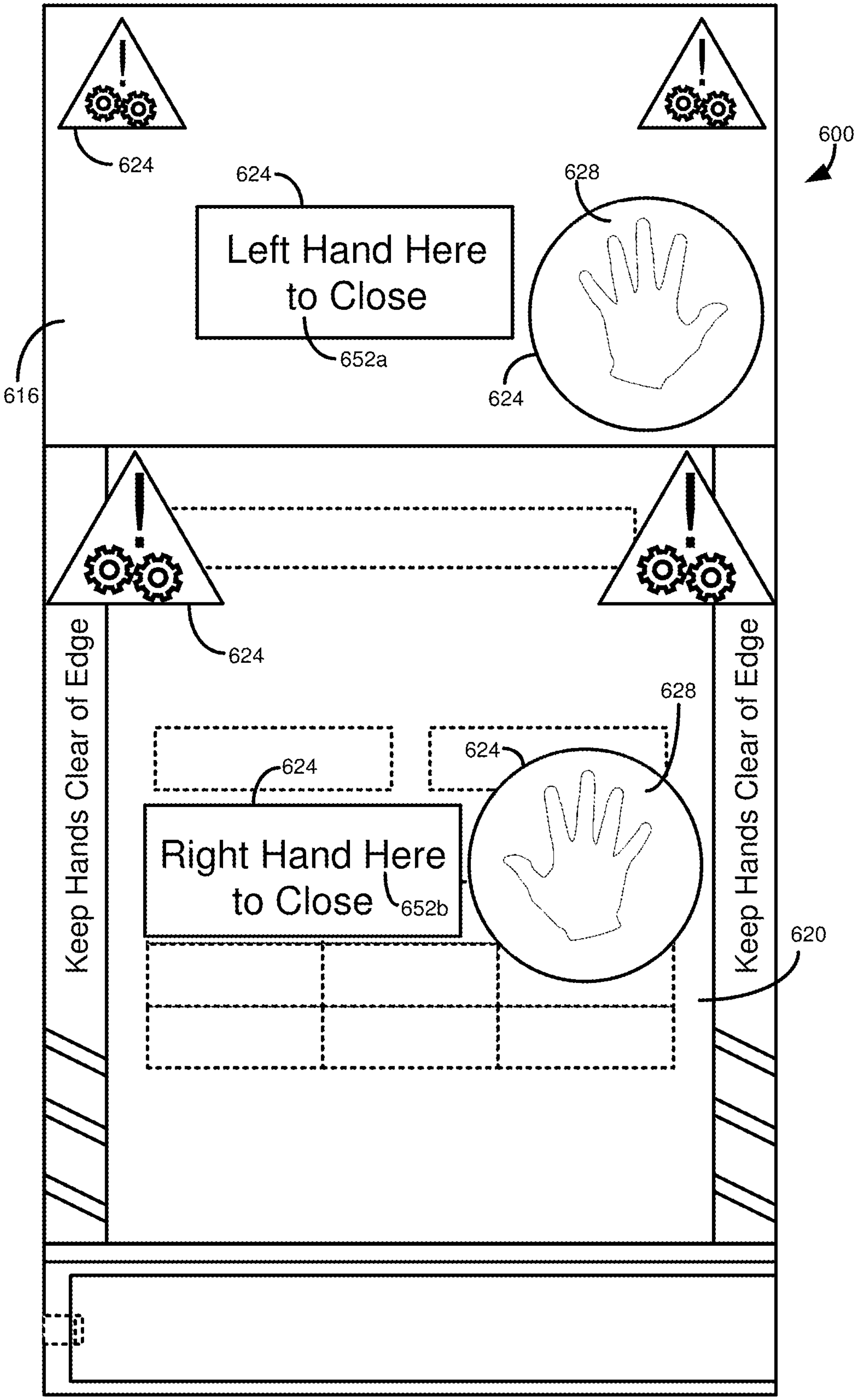
FIG. 6 is a diagram of an electronic gaming machine having supplemental information concurrently rendered on a plurality of displays.

FIGS. 4 and 5A-5C illustrate supplemental information being displayed on a single display of an EGM, where in at least some cases the EGM can include multiple displays (where displays can be considered to be separate if they constitute physically different units, such as different physical display panels, even if the displays can be operated by a common controller or can be used to display common visual elements, such as different portions of an image). FIG. 6 illustrates how supplemental information 624 can be displayed on multiple discrete displays to accomplish a particular action with respect to an EGM, such as opening, closing, or otherwise manipulating one or more components of the EGM.

FIG. 6 illustrates an EGM 600 that can be at least generally similar to the EGM 400 of FIG. 4. Supplemental information 624 is shown displayed on a topper display 616 and a primary display 620. FIG. 6 can represent a scenario where the right side of the EGM 600 is to be manipulated, such as pushed, as a unit in order to accomplish an action.

The EGM 600 can have guide information 628 displayed on the primary display 620 and guide information displayed on the topper display 616. The EGM 600 is shown as including two instances of text information, 652*a*, 652*b*, which can provide detail regarding actions a user should take to accomplish a result (e.g., close or secure a component of the EGM 600). Text information 652*a* can indicate which hand (i.e., left or right) should be used on the topper display 616 and text information 652*b* can indicate which hand should be used on the primary display 620. If desired, the text information 652*a*, 652*b* can provide other information helpful in accomplishing an action (e.g., turn left, turn right, pull, push, slide, etc., as well as more detailed information, such as "push until clicking sound is heard.").

Example 9—Example Supplemental Information Displayed on Alternate Display

As has been described, displaying supplemental information on an EGM can be helpful in guiding users in taking particular actions in association with a component on which the supplemental information is displayed. For instance, it has been described that guide information can be displayed on a primary display of a movable user interface, where the guide information can help a user open, close, or taken other actions with respect to the movable user interface. In some cases, it may be desirable to display information that can assist a user in taking actions with respect to a component of an EGM other than a component on which the supplemental information is displayed. In some scenarios, for instance, a user may have moved a component of the EGM that includes a display such that the user can no longer conveniently view the display or has taken actions such that the display is not operational. In such cases, supplemental information for a first portion of the EGM can be rendered on a display associated with a second portion of the EGM.

Figure 7:
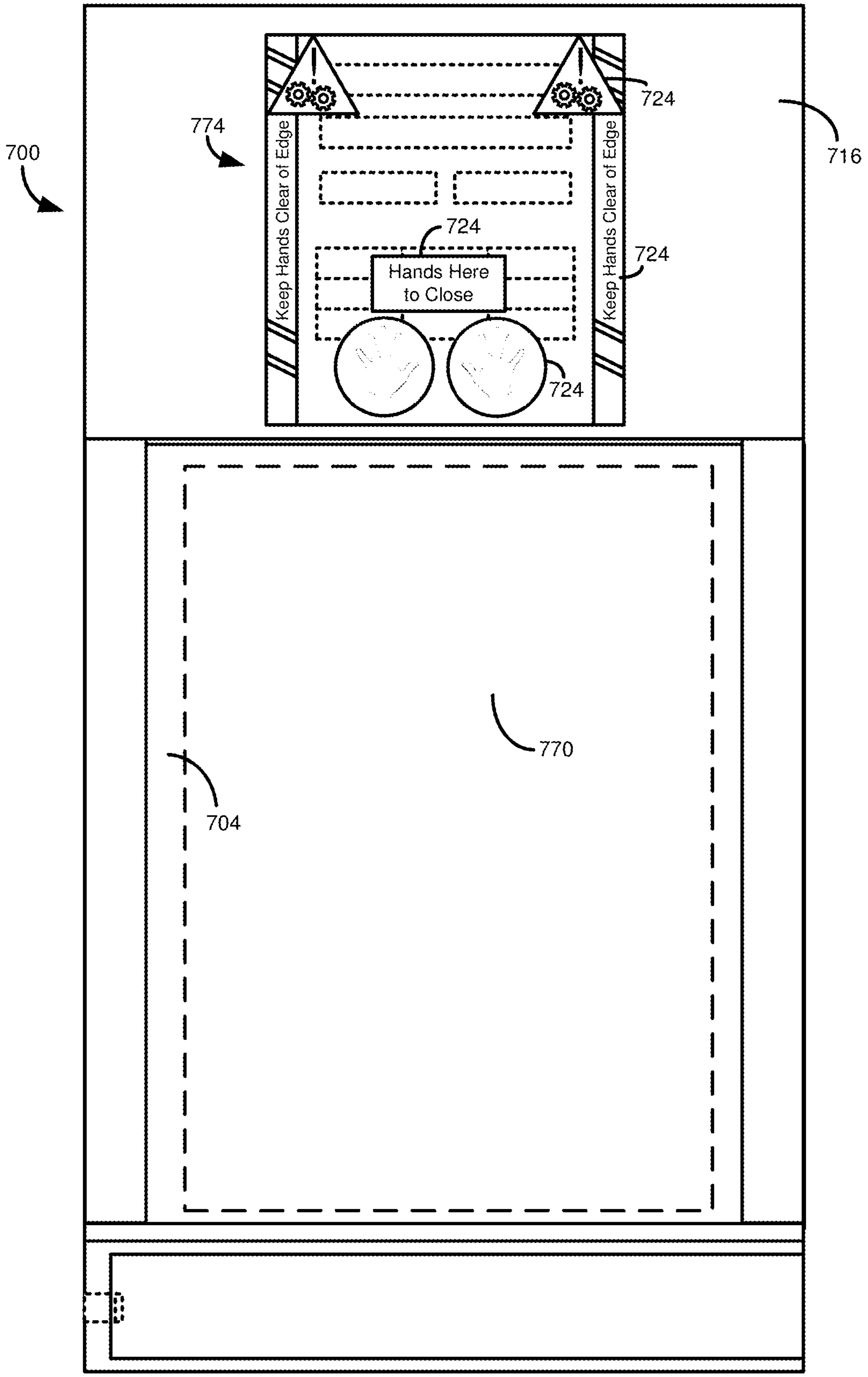
FIG. 7 is a diagram of an electronic gaming machine having a first display of the electronic gaming machine rendering supplemental information relating to another portion of the electronic gaming machine.

FIG. 7 illustrates an EGM 700 that can be at least generally similar to the EGM 400 of FIG. 4. The EGM 700 includes a topper display 716 and can have a primary display, which can be at least generally similar to the primary display 420 of the EGM 400 of FIG. 4. However, in FIG. 7, the primary display has been removed or moved to allow access to an interior portion 770 of a cabinet section 704. For instance, the primary display may have been made to allow a user to inspect, repair, upgrade, or otherwise perform actions on the interior portion 770 or components located in the interior portion. As the primary display may not be currently visible to the user, or perhaps even capable of rendering displays, supplemental information 724 can be displayed on the topper display 716. The topper display 716 can render an image 774 of other portion of the EGM 700, such as the primary display. The supplemental information 724 can otherwise be at least generally analogous to the supplemental information 424 of FIG. 4.

In some cases, supplemental information 724 can be displayed on the topper display 716 and the primary display. For instance, even if the primary display is not currently conveniently visible to a user, it may become visible to the user as the user performs actions on the EGM 700. In the case of replacing the primary display in an operational position, as the primary display becomes close to its final position, covering the interior portion 770, it may become more convenient for a user to view the supplemental information 724 on the primary display than on the topper display 716. Or, it may be convenient for the user to be able to view the supplemental information 724 on both the primary display and the topper display 716.

In further cases, the EGM 700 (e.g., a controller responsible for video rendering functions) can transition the display of supplemental information 724 between the primary display and the topper display 716, and vice versa, at different points in a procedure, which can be detected by sensors, or as otherwise determined. For instance, if a latch is detected as engaged, the supplemental information 724 can be transitioned from the topper display 716 to the primary display. As has been described, such transition can also result in a change of some or all of the informational content of the supplemental information 724.

Figure 8:
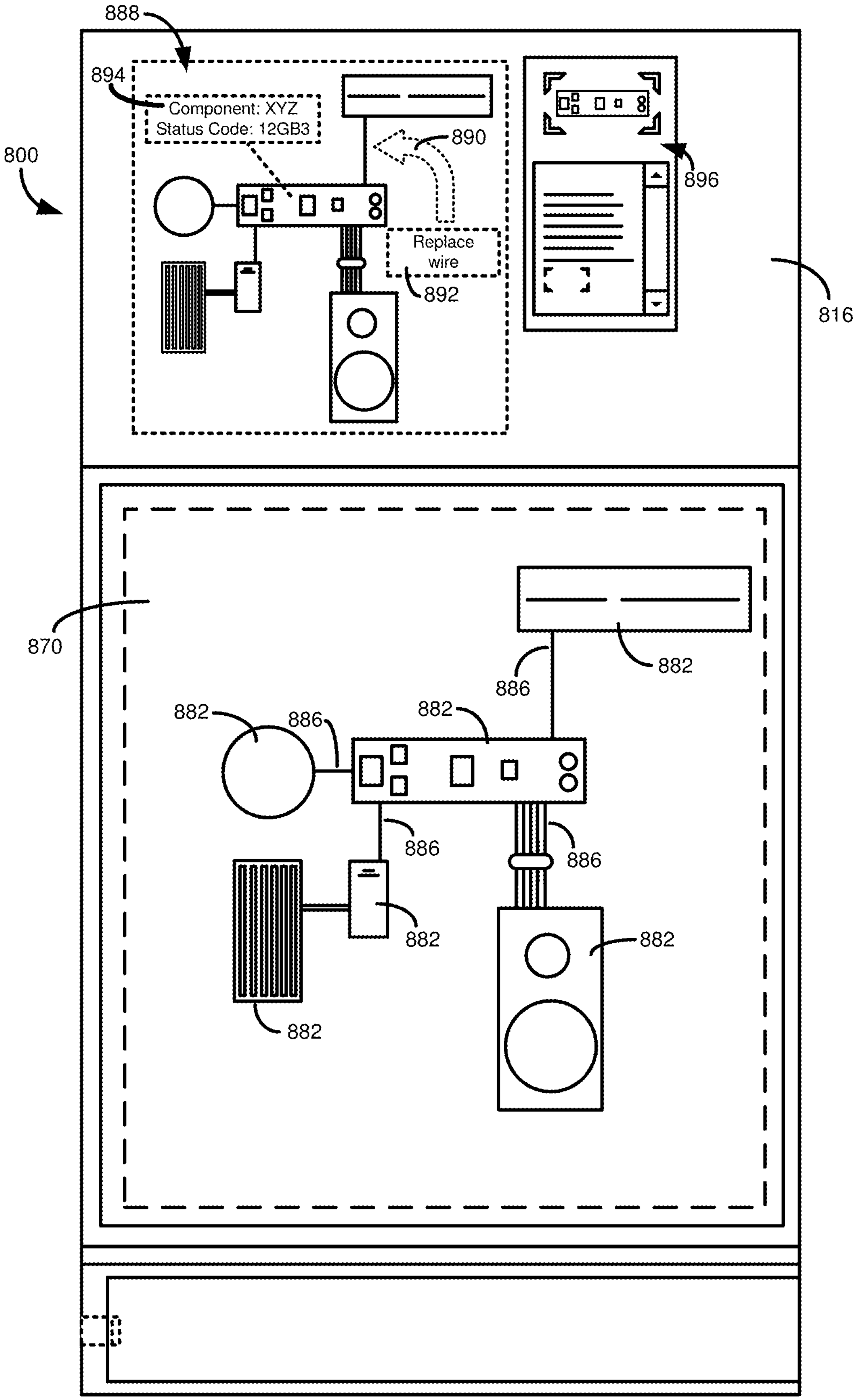
FIG. 8 is a diagram illustrating a display of an electronic gaming machine displaying supplemental information to facilitate servicing of the electronic gaming machine.

Example 10—Example Supplemental Information for Use in Servicing an Electronic Gaming Machine In FIGS. 4-7, the supplemental information primary related to warning information, and instructions regarding physical manipulation of an EGM. However, the supplemental information can include other types of content. FIG. 8 illustrates an EGM 800 that can be at least generally similar to the EGM 400 of FIG. 4. The EGM 800 includes a topper display 816 and a primary display (not shown). In FIG. 8, the primary display is shown as moved or removed to provide access to an interior portion 870 of the EGM 800.

The interior portion 870 of the EGM 800 can include various components 882 used in operation of the EGM 800, including ticketing or currency accepting or dispensing features, the provision or audio or visual content, communications components (e.g., networking components), components used in providing a game or determining a game outcome, or other functions. The components 882 can include interconnections 886, such as wires, cables, ribbons, buses, and the like.

A display of the EGM 800, such as the topper display 816 or a primary display, can display information that can facilitate a user in repairing, maintaining, or upgrading the EGM. For instance, storage (e.g. memory or secondary storage associated with a computing device or component of the EGM 800), can include rules or steps for particular repair, update, or maintenance procedures, and information regarding these steps can be rendered for display to guide a user through a procedure. In a specific example, a display 888 representing all or a portion of the components 882 and interconnections 886 can be rendered. Portions of the display 888 corresponding to a component 882 or an interconnection 886 can be visually highlighted (e.g., by having the relevant portion of the display flash, be displayed in a different color, or be displayed more prominently than other portions) or labelled, such as with an arrow 890, to guide a user to the component or interconnection. Instructional content 892 can be provided to provide information to a user on how to carry out a particular step of a procedure or to otherwise accomplish a particular action. Reference content 894 can be provided, such as a part number, serial number, schematic information, etc., regarding a particular component 882 or interconnection 886 to be replaced, manipulated, etc.

Topper display 816 (or another display) can display additional content 896. The additional content 896 can include visual and/or textual content illustrating repair procedures, part or component schematics, etc. For instance, the EGM 800, or a component thereof, may be associated with a repair manual or a user manual, and such information may be rendered in the display 896 of additional content. The displays 888, 896 may display content that demonstrates to a user how to remove, replace repair, or access a component 882 or an interconnection 886. Particularly for more common repair or maintenance procedures, for example, a display 888, 896 can render a video clip or animation that demonstrate how a repair procedure should be performed. Providing repair manuals and similar content through the EGM 800 can reduce the cost of providing printed documents, and can make the documents more readily available. For example, the documents may be available to general users or service personnel rather than requiring a service call, or consultation, with specialized service providers or component suppliers.

The displays 888 and 896 may be interactive, so that a user can select or alter displayed content (e.g., selecting a component 882 to obtain more information regarding the component, scrolling to different portions of a user or repair manual). Similarly, the user may choose to navigate to different procedures, or to move forward or back (e.g., a prior step or next step) in a procedure. On-screen checklists can be provided, where a user may select a particular step as completed or not, or to obtain information regarding, or start, one or more actions listed in the task list. In some cases, the checklist can be automatically updated as items are determined by the EGM 800 to have been completed (e.g., in response to data received from sensors of the EGM or from components 882 of the EGM).

The displays 888 and 896 may also be dynamic, such as rendering different information in response to detection of user's action. For instance, if the EGM 800 detects that a component has been added or removed, or a step of a procedure performed, the EGM 800 can update a display 888, 896 to illustrate a next step of a procedure, or indicate that a procedure has been performed. Similarly, the EGM 800 can cause a display 888, 896 to render an indication of whether a step has been performed correctly or incorrectly (e.g., an interconnection 886 is not seated, or is not detected as transmitting data, or a component 882 is not responding). The EGM 800 can display information guiding a user how to correct an action that was completed incorrectly, including based on particular sensor data received by the EGM or data received (or not received) from a component 882.

Example 11—Example Operations for Displaying Supplemental Information

Figure 9:
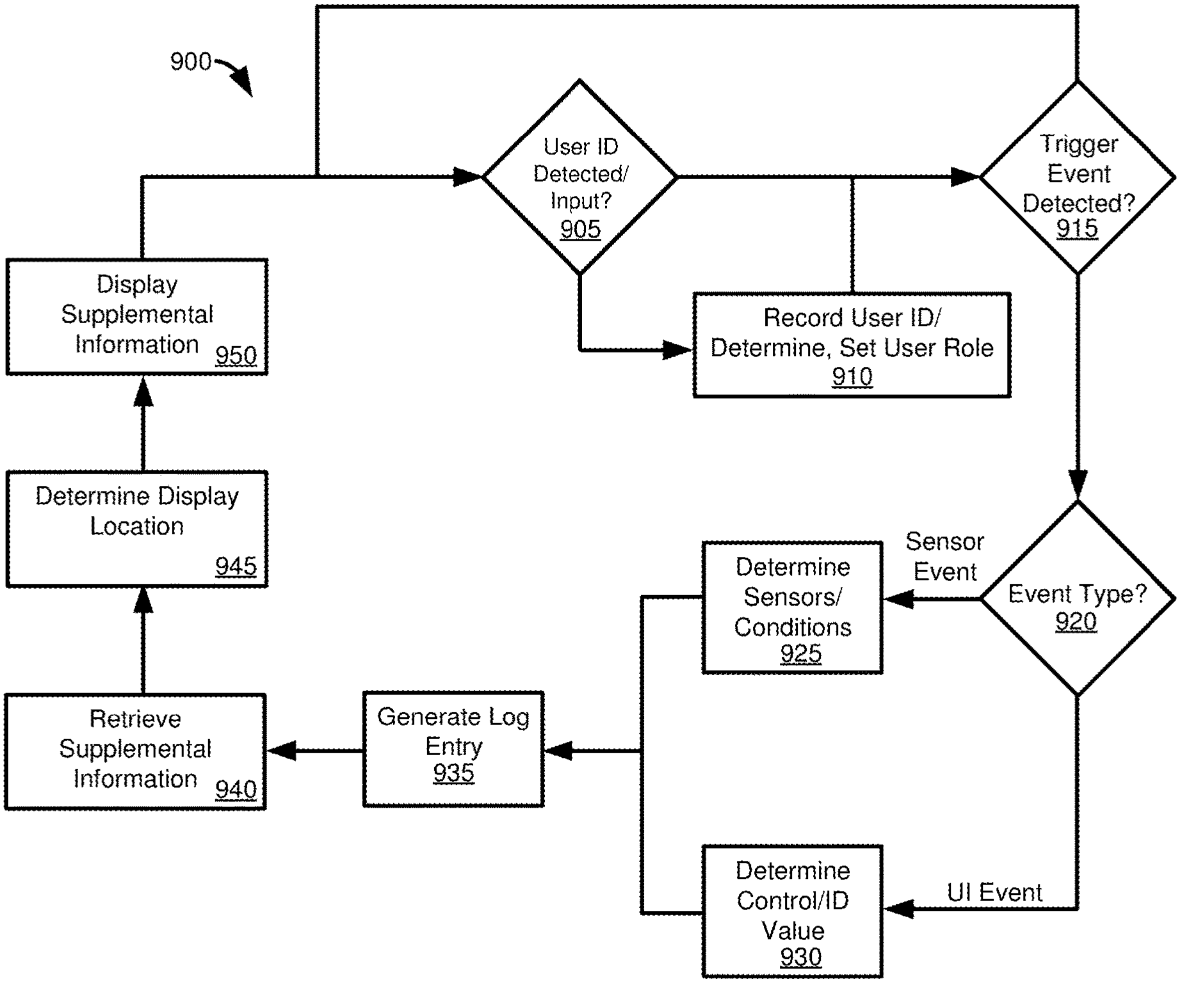
FIG. 9 is a flowchart of example operations for presenting supplemental information on an electronic gaming machine.

FIG. 9 is a flowchart of example operations 900 for determining whether supplemental information should be displayed on an electronic gaming machine (EGM) and for displaying such information. The gaming machine can be, for example, the gaming machine 104A of FIG. 1, the gaming machine 300 of FIG. 3, the gaming machine 400 of FIG. 4, or another gaming machine, including other EGMs described herein. The operations 900 can be carried out as a continuous loop, which can start when the EGM is activated, or at another time, and can cease when the EGM is deactivated, when terminated or suspended by a user, or in response to other action (e.g., automatically in response to detected conditions). Although the operations 800 are shown as occurring in a particular order, the operations can be carried in a different order unless otherwise specified, or unless the operations are not capable of being carried out in a different order. Similarly, additional actions can be included in the operations 800, or certain operations excluded, without departing from the scope of the present disclosure.

At 905, it is determined whether a user identifier (which could be an identifier of a particular user role, rather than of a particular individual, in at least some implementations) has been detected. Detection of a user identifier can include a user or role identifier input by a user, or a signal, such as a RFID tag, that is associated with a particular user or user role. If a user identifier is determined at 905, the user identifier or role is recorded at 910. The user or role identifier can be used to determine supplemental information that should be displayed and conditions under which such supplemental information should be displayed.

Once the user identifier has been recorded, or if no user identifier was provided, the operations proceed to 915. At 915 it is determined whether a trigger event has occurred. A trigger event can occur via user input or in response to events detected by a sensor, such as the opening of a compartment of an EGM or in response to manipulation of a component of an EGM (which can include, for example, turning a key in a lock). If a trigger event has not occurred, the operations 900 can return to 905.

If a trigger event is detected, the operations 900 can proceed to 920, where it is determined whether the triggering event was, or included, sensor data, or if the event was in response to a user interface action (e.g., a user selecting an action through a user interface of the EGM or a device placed in communication with the EGM). For example, it is determined whether the trigger event is in response to the detection of a component of the EGM being opened or moved, which can include movement (e.g., rocking) of the EGM. Sensors can also be used to detect attempts to tamper with the EGM, which can include physically tampering with the EGM or interacting with the EGM via electronic means or through data connections (e.g., an attempt to hack the EGM via a network or physical connection). If it is determined at 920 that the trigger event was a sensor event, the sensors conditions can be determined or analyzed at 925. For example, sensor data, including data from multiple sensors, can be compared to a set of rules or heuristics to determine a particular activity that in turn can be associated with particular supplemental information.

If it is determined at 920 that the trigger event is a user interface event, the operations 900 can proceed to 930 where it is determine what UI elements were associated with the trigger and, optionally, one or more values. The determined UI elements and values can be associated with a particular action, which in turn can be associated with particular supplemental information.

After 925 or 935, the operations 900 proceed to 935, where a log entry is generated. The log entry can include the sensors/conditions determined at 925 or the UI control identifiers/values determined at 930. The entry can include other information, such as a timestamp, an identifier of the determined action or supplemental information that is associated with an action or which is otherwise to be displayed, an identifier of a user or user role, other information, or combinations thereof.

Supplemental information can be retrieved at 940. The particular supplemental information retrieved can be determined based at least in part on a user identifier or an identifier of a user role, and can be based on one or more indicators determined at 925, 930. As an example, supplemental information having identifiers 1111, 2134, 0123, can be determined to be retrieved. Each of the identifiers can associated with particular supplemental information, which supplemental information can include an indication of visual or other content to be displayed or otherwise provided, a position and other display information for use in retendering visual content for display, how to process user input, etc. For instance, the supplemental information can indicate if an aspect of the supplemental information is selectable, or if user interactions with the supplemental information are monitored or recorded.

A display location for visual supplemental information is determined at 945. As described above, in some cases, the location can be specified by the supplemental information. In other cases, the location can be determined by a rendering component of the EGM (e.g., a controller). For instance, the controller can include a layout manager that determines where supplemental information should be rendered. In making such determination, the controller can consider other information, including information provided by sensors, such as which displays are available, which portions of the EGM are open or being serviced, etc. The supplemental information is then displayed at 950.

The operations 900 can continue to 905 after the supplemental information is displayed (or otherwise output, such as providing audio or haptic output) at 950. In some implementations, the operations 900 can be carried out for multiple events/supplemental information concurrently, including having such operations being different at a particular point in time (e.g., a first event is at 915 and a second event is at 945).

Although the operations 900 have generally as described when, and what, supplemental information should be output, the operations 900 can also be used to determine when a change should occur in the supplemental information that is output (e.g., elements of a screen updated, such as marking a checkbox associated with an action, or a different screen or screen elements displayed) or that supplemental information should no longer be output. For instance, an event type determined at 920 can be "door closure," which can result in supplemental information no longer being displayed at 950 (e.g., 950 is a "stop rendering" step).

Example 12—Example Embodiments

In one embodiment, a method is provided that is performed by an electronic gaming machine that includes at least one processor and at least one computer-readable media coupled to the at least one processor. The computer-readable media includes instructions for performing the method. The method includes determining that a triggering event has occurred. The triggering event indicates that supplemental information should be rendered for display on the electronic gaming machine. In a particular example, the triggering event can include sensor data indicating movement of the electronic gaming machine or a component thereof. A log entry corresponding to the triggering event can be written. In some embodiments, the method can also include determining that the electronic gaming machine is not in a game play mode, such as being in a standby or setup mode, or a service mode.

At least one condition associated with the triggering event is determined. Supplemental content is determined that is associated with the at least one condition. The supplemental information does not relate to game play on the electronic gaming machine, such as relating to servicing of the electronic gaming machine, or attempts to tamper with the electronic gaming machine. A position is determined at which the supplemental information should be displayed, and the supplemental information is rendered at the determined position.

In more particular embodiments, the supplemental information can include at least one of a safety warning, pinch point, center of gravity information, or technical bulletin. The supplemental information can include at least one of an animated warning or a photographic image.

The electronic gaming machine can include a player interface that includes a touchscreen display. The player interface, in some examples, can be movable. At least a portion of the supplemental information is rendered on the player interface. Supplemental information rendered on the player interface can include a handling guide indicating at least one action to be taken by a user with respect to the user interface. The method can include detecting user contact with the player interface and comparing the user contact with a condition associated with the handling guide. If it is determined that the user contact does not satisfy the condition, a warning or correction message can be rendered for display, indicating to a user that the condition was not satisfied. If it is determined that the user contact does satisfy the condition, an indication that the condition was satisfied can be rendered for display. Or, the supplemental information can be caused to no longer be rendered for display. In yet another embodiment, if the condition is satisfied, second supplemental information can be rendered for display, where the handling guide constitutes first supplemental information. The first and second supplemental information can correspond with first and second steps in a procedure having multiple steps.

In another implementation, the electronic gaming machine incudes a first display in the form of a player interface that includes a touchscreen display and a second display. At least a portion of the supplemental information is rendered on the second display, such as a handling guide indicating at least one action to be taken by the user with respect to the player interface. User contact with the player interface can be detected and compared with a condition associated with the handling guide. An indication of whether the condition is satisfied can be rendered for display.

In further examples, a user identifier or user role can be determined. Supplemental information associated with the condition can be determined at least in part on the user identifier or user role Supplemental information can include one or more images of a hand. An image of a hand can provide an indication of where a user should manipulate the electronic gaming machine. Supplemental information can include feedback other than, or in addition to, visual feedback. For example, supplemental information can include an audible warning generated using an audio speaker associated with the electronic gaming machine. The audible information can include at least one of a warning sound or a recording. The supplemental information can also include haptic feedback, which can be rendered on one or more components of the electronic gaming machine.

In another embodiment, the present disclosure provides a gaming device that includes a display and a cabinet, the cabinet having a door configured to provide access to an interior space of the cabinet. A sensor is in communication with the door. The gaming device can also include a player interface that includes a touchscreen, a processor, and memory storing instructions executable on the processor.

The instructions can include receiving data from the sensor indicating that the door was moved from a secured position to an unsecured position. It can be determined that the data triggers a condition associated with supplemental information to be rendered on the display, where the supplemental information does not relate to game play on the gaming device. Supplemental information associated with the condition is determined and rendered on the display.

In yet a further embodiment, computer-readable storage media is provided that includes instructions for performing processing. The processing includes receiving an indication that a user is to service one or more components of an electronic gaming machine. Supplemental information can be displayed on a display of the electronic gaming machine. The supplemental information can include an action to be taken by the user with respect to a component of the one or more components. A user interaction with the component of the one or more components is detected. An indication of whether the action was correctly performed by the user can be rendered for display.

Example 13—Example Considerations

Numerous embodiments are described in this disclosure, and are presented for illustrative purposes only. The described embodiments are not, and are not intended to be, limiting in any sense. The presently disclosed technologies are widely applicable to numerous embodiments, as is readily apparent from the disclosure. One of ordinary skill in the art will recognize that the disclosed technologies may be practiced with various modifications and alterations, such as structural, logical, software, and electrical modifications. Although particular features of the disclosed technologies may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the disclosed technologies that must be present in all embodiments.

The Title (set forth at the beginning of the first page of this disclosure) is not to be taken as limiting in any way as the scope of the disclosed embodiments.

The term "product" means any machine, manufacture and/or composition of matter as contemplated by 35 U.S.C. § 101, unless expressly specified otherwise.

Each process (whether called a method, class behavior, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component, structure, or article is described herein, more than one device, component, structure or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component, structure, or article is described herein (whether or not they cooperate), a single device, component, structure, or article may alternatively be used in place of the more than one device, component, structure, or article that is described. For example, a plurality of computer-based devices may be substituted with a single computer-based device. Accordingly, the various functionality that is described as being possessed by more than one device, component, structure, or article may alternatively be possessed by a single device, component, structure, or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the disclosed technologies. Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the disclosed technologies, and does not imply that the illustrated process is preferred.

Although a process may be described as including a plurality of steps, that does not indicate that all or even any of the steps are essential or required. Various other embodiments within the scope of the disclosed technologies include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the disclosed technologies include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

It will be readily apparent that the various methods and algorithms described herein may be implemented by a control system and/or the instructions of the software may be designed to carry out the processes of the disclosed technologies.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or disclosed technologies. Some of these embodiments and/or disclosed technologies may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The foregoing description discloses only exemplary embodiments of the disclosed technologies. Modifications of the above disclosed apparatus and methods which fall within the scope of the disclosed technologies will be readily apparent to those of ordinary skill in the art. For example, although the examples discussed above are illustrated for a gaming market, embodiments of the disclosed technologies can be implemented for other markets.

Accordingly, while the disclosed technologies has been disclosed in connection with exemplary embodiments thereof, it should be understood that other embodiments may fall within the spirit and scope of the disclosed technologies, as defined by the following claims.

The invention claimed is:

1. An electronic gaming machine comprising:

at least one processor;

a player interface comprising a touch screen display; and at least one computer-readable medium coupled to the at least one processor and comprising computer-executable instructions executable by the at least one processor to:

determine that a triggering event has occurred, the triggering event in response to external interaction with the electronic gaming machine and indicating that supplemental information should be rendered for display on the electronic gaming machine;

determine at least one first condition associated with the triggering event;

determine the supplemental information associated with the at least one first condition;

render the supplemental information for display, the supplemental information being unrelated to game play by a particular player of the electronic gaming machine, at least a portion of the supplemental information being rendered on the player interface, the at least the portion of the supplemental information rendered on the player interface comprises a handling guide indicating at least one action to be taken by a user with respect to the player interface and a location of the touch screen display where the at least one action should not be performed;

detect user contact with the player interface;

compare the user contact with a second condition associated with the handling guide; and determine whether the user contact satisfies the second condition.

2. The electronic gaming machine of claim 1, wherein determining whether the user contact satisfies the second condition includes determining whether the user contact is at the location.

3. The electronic gaming machine of claim 1, wherein the location is a first location and determining whether the user contact satisfies the second condition includes determining whether the user contact is at a second location of the touch screen display where the user should take the at least one action.

4. The electronic gaming machine of claim 1, wherein the handling guide includes safety information.

5. The electronic gaming machine of claim 1, wherein the at least one action includes closing a door.

6. The electronic gaming machine of claim 5, wherein the touch screen display is a component of the door.

7. The electronic gaming machine of claim 6, wherein the triggering event comprises opening of the door.

8. The electronic gaming machine of claim 1, wherein the triggering event comprises the user indicating an intention to open a door.

9. The electronic gaming machine of claim 8, wherein the at least one action comprises opening the door.

10. A computer program product, comprising at least one non-transitory storage medium that stores:

first instructions, executable by at least one processor of an electronic gaming device, the electronic gaming device including a player interface comprising a touch screen display, to determine that a triggering event has occurred, the triggering event in response to external interaction with the electronic gaming device and indicating that supplemental information should be rendered for display on the electronic gaming device;

second instructions, executable by the at least one processor to determine at least one first condition associated with the triggering event;

third instructions, executable by the at least one processor to determine the supplemental information associated with the at least one first condition;

fourth instructions, executable by the at least one processor to render the supplemental information for display, the supplemental information being unrelated to game play by a particular player of the electronic gaming device, at least a portion of the supplemental information being rendered on the player interface, the at least the portion of the supplemental information rendered on the player interface comprises a handling guide indicating at least one action to be taken by a user with respect to the player interface at a location of the touch screen display;

fifth instructions, executable by the at least one processor to detect user contact with the player interface;

sixth instructions, executable by the at least one processor to compare the user contact with a second condition associated with the handling guide; and seventh instructions, executable by the at least one processor to determine whether the user contact satisfies the second condition.

11. The computer program product of claim 10, wherein the location is a first location and the handling guide further indicates a second location of the touch screen display where the user should not take the at least one action.

12. The computer program product of claim 11, wherein determining whether the user contact satisfies the second condition includes determining whether the user contact is at the second location.

13. The computer program product of claim 10, wherein the handling guide includes a graphic of a hand.

14. The computer program product of claim 10, wherein the location is a first location and the handling guide further indicates a second location of the touch screen display where the user should not touch.

15. The computer program product of claim 14, wherein the second location is an edge of the touch screen display.

16. The computer program product of claim 10, wherein the handling guide includes text describing the at least one action.

17. The computer program product of claim 10, further comprising eighth instructions, executable by the at least one processor to, upon determining that the user contact satisfies the second condition, ceases display of the at least the portion of the supplemental information rendered on the player interface.

18. The computer program product of claim 10, further comprising eighth instructions, executable by the at least one processor to, upon determining that the user contact does not satisfy the second condition, renders for display a warning or a correction message indicating to the user that the second condition was not satisfied.

19. A method, performed by an electronic gaming device comprising at least one processor, a player interface comprising a touch screen display, and at least one computer-readable medium coupled to the at least one processor and comprising computer-executable instructions for performing the method, the method comprising:

determining that a triggering event has occurred, the triggering event in response to external interaction with the electronic gaming device and indicating that supplemental information should be rendered for display on the electronic gaming device;

determining at least one first condition associated with the triggering event;

determining the supplemental information associated with the at least one first condition;

rendering the supplemental information for display, the supplemental information being unrelated to game play by a particular player of the electronic gaming device, at least a portion of the supplemental information being rendered on the player interface, the at least the portion of the supplemental information rendered on the player interface comprises a handling guide indicating at least one action to be taken by a user with respect to the player interface at a location of the touch screen display;

detecting user contact with the player interface;

comparing the user contact with a second condition associated with the handling guide; and determining whether the user contact satisfies the second condition.

20. The method of claim 19, wherein determining whether the user contact satisfies the second condition includes determining whether the user contact is at the location.

* * * * *